(12) United States Patent
Adimatyam et al.

(10) Patent No.: US 9,438,745 B2
(45) Date of Patent: Sep. 6, 2016

(54) PROGRAM SERVICES INCLUDING ADAPTIVE FAILOVER AND BACKUP SERVICES

(71) Applicant: Verizon Patent and Licensing Inc., Basking Ridge, NJ (US)

(72) Inventors: Venkata S. Adimatyam, Irving, TX (US); Sameer Gavade, Irving, TX (US); Tariq Roshan, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 157 days.

(21) Appl. No.: 14/192,988

(22) Filed: Feb. 28, 2014

(65) Prior Publication Data

US 2015/0249512 A1    Sep. 3, 2015

(51) Int. Cl.

| | |
|---|---|
| *H04N 7/173* | (2011.01) |
| *H04M 11/08* | (2006.01) |
| *H04H 20/12* | (2008.01) |
| *H04N 17/00* | (2006.01) |
| *H04N 21/654* | (2011.01) |
| *H04N 21/61* | (2011.01) |
| *G06F 11/14* | (2006.01) |
| *H04L 29/06* | (2006.01) |

(52) U.S. Cl.
CPC .......... *H04M 11/08* (2013.01); *G06F 11/1458* (2013.01); *H04H 20/12* (2013.01); *H04L 65/1083* (2013.01); *H04L 65/80* (2013.01); *H04N 17/004* (2013.01); *H04N 21/6106* (2013.01); *H04N 21/6131* (2013.01); *H04N 21/6181* (2013.01); *H04N 21/654* (2013.01)

(58) Field of Classification Search
CPC ............... H04N 21/2402; H04N 21/2401; H04N 21/2404; H04N 21/26291; H04N 21/44231; H04N 21/4424; H04N 21/4425; H04N 21/24; H04N 21/2405
USPC ........................................ 725/9, 12, 14, 107
See application file for complete search history.

(56) References Cited

U.S. PATENT DOCUMENTS

| | | | |
|---|---|---|---|
| 8,200,600 B2* | 6/2012 | Rosenstein | G06N 7/005 706/46 |
| 2005/0183130 A1* | 8/2005 | Sadja | H04N 7/17309 725/107 |
| 2007/0169149 A1* | 7/2007 | Jennings | H04N 7/165 725/58 |
| 2008/0109862 A1* | 5/2008 | Jost | H04N 7/173 725/107 |

* cited by examiner

*Primary Examiner* — Nnenna Ekpo

(57) ABSTRACT

A method, a device, and a non-transitory, computer-readable medium stores executable instructions to provide a program service; predict whether a disruption in the program service is to occur; generate and transmit a message, which indicates a predicted disruption of the program service, to user devices; switch to another program device, by the user devices, to receive the program service; transmit another message to the user device when the disruption is over. Additionally, a method, a device, and a non-transitory, computer-readable medium stores executable instructions to provide a failure over service that informs other user devices that an in-home server device is down, and a backup service that includes storing program service data, which includes recorded programs and user settings, on the in-home server device and a cloud device. The backup service also includes a recovery service that restores the program service data when the in-home server device is replaced.

20 Claims, 21 Drawing Sheets

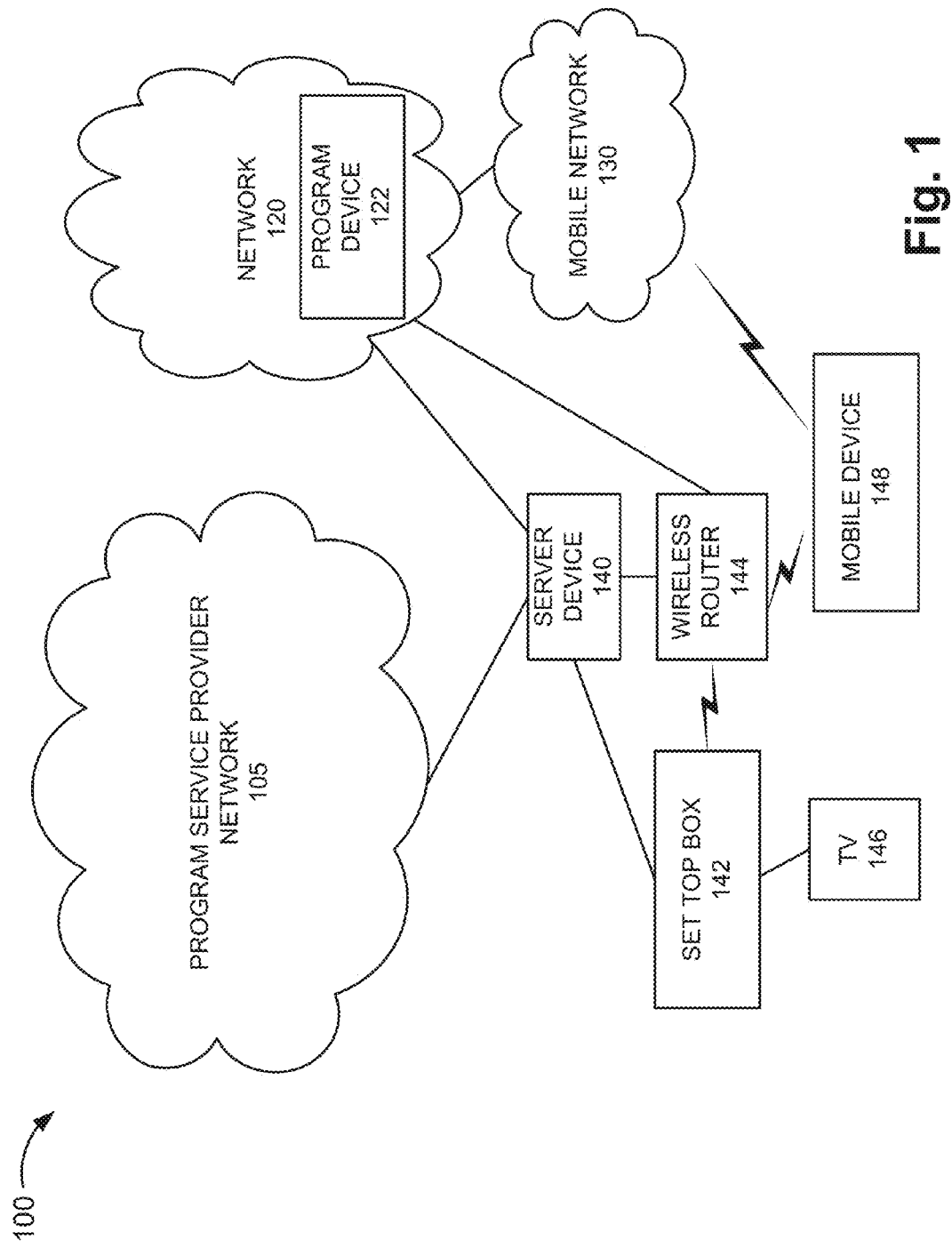

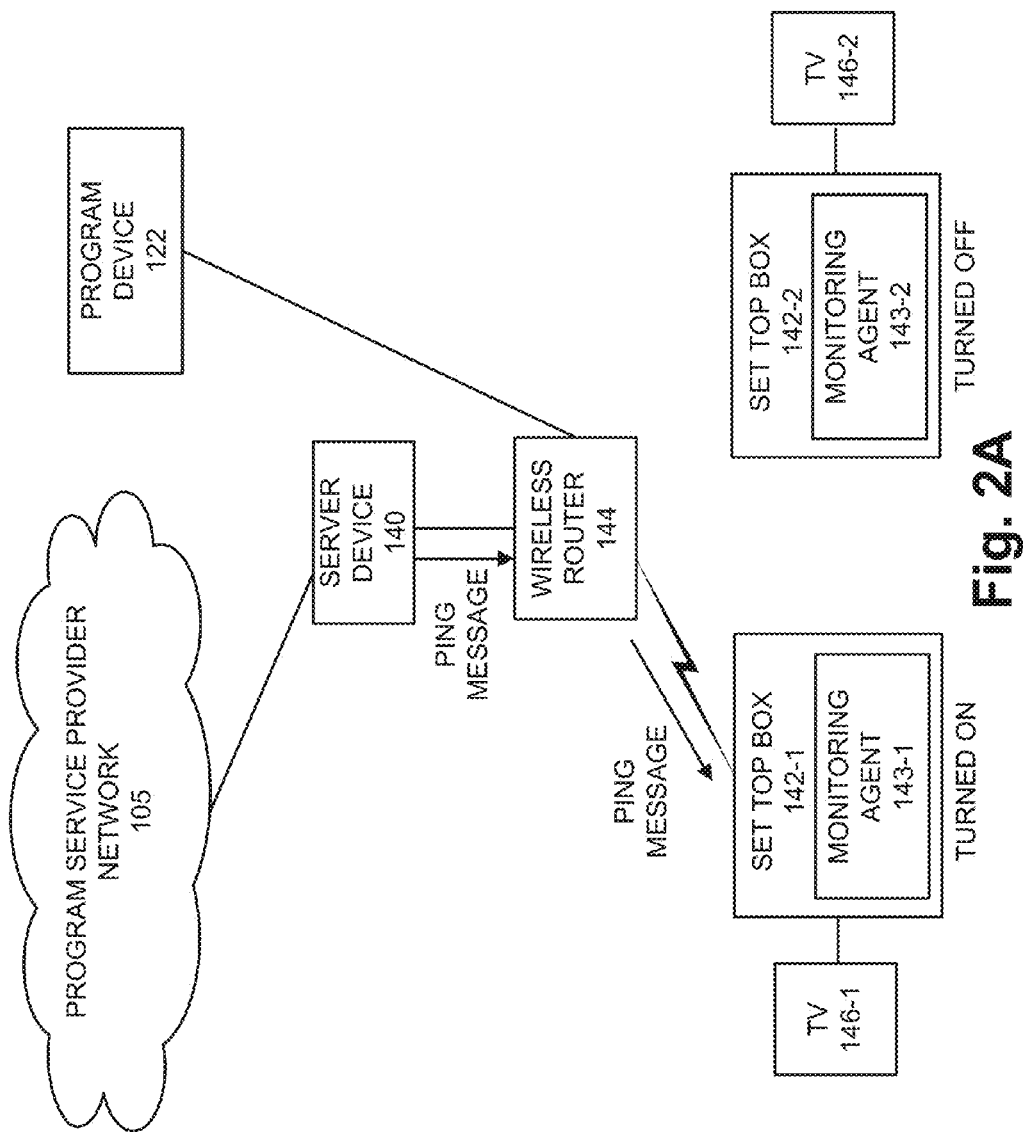

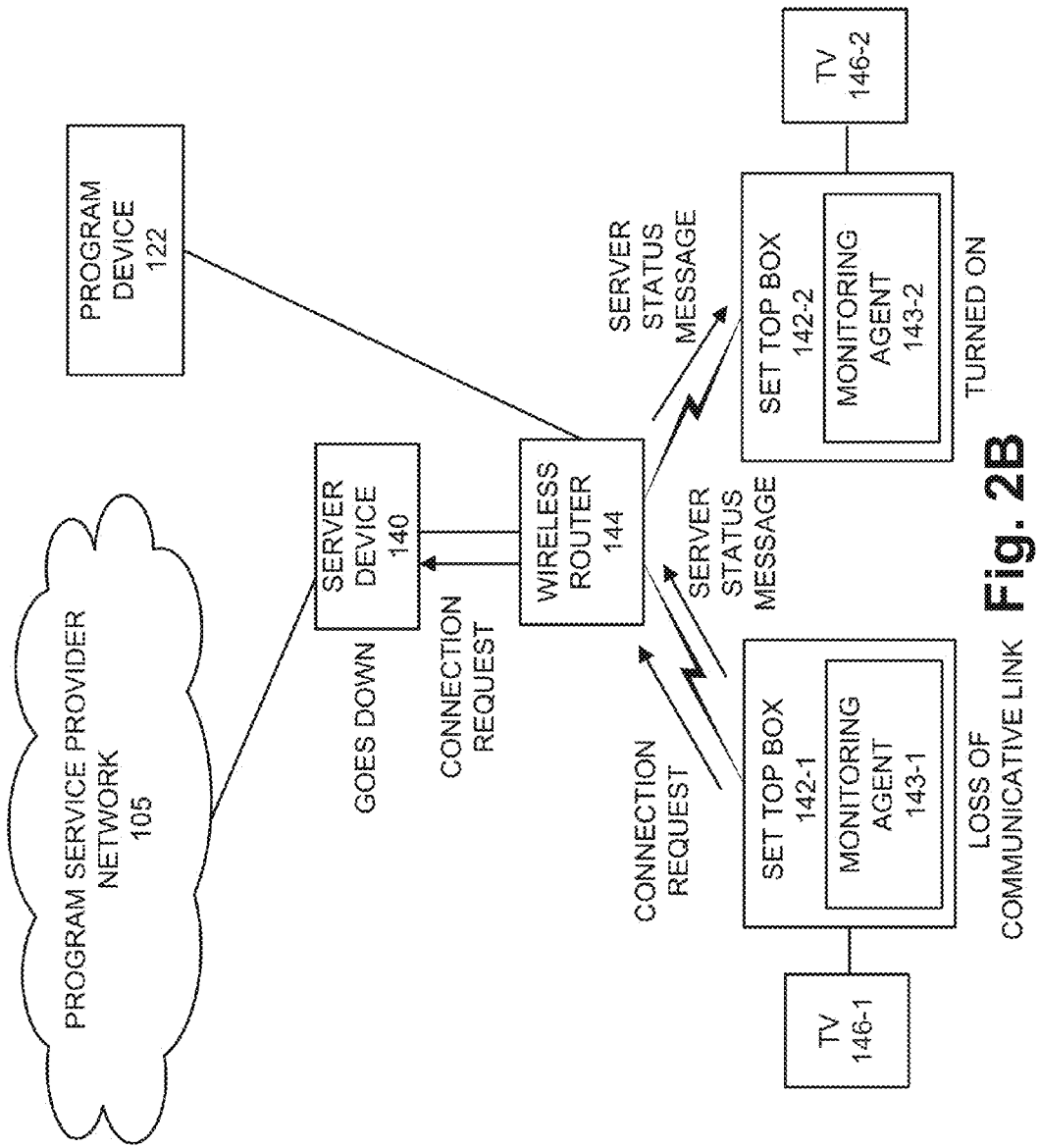

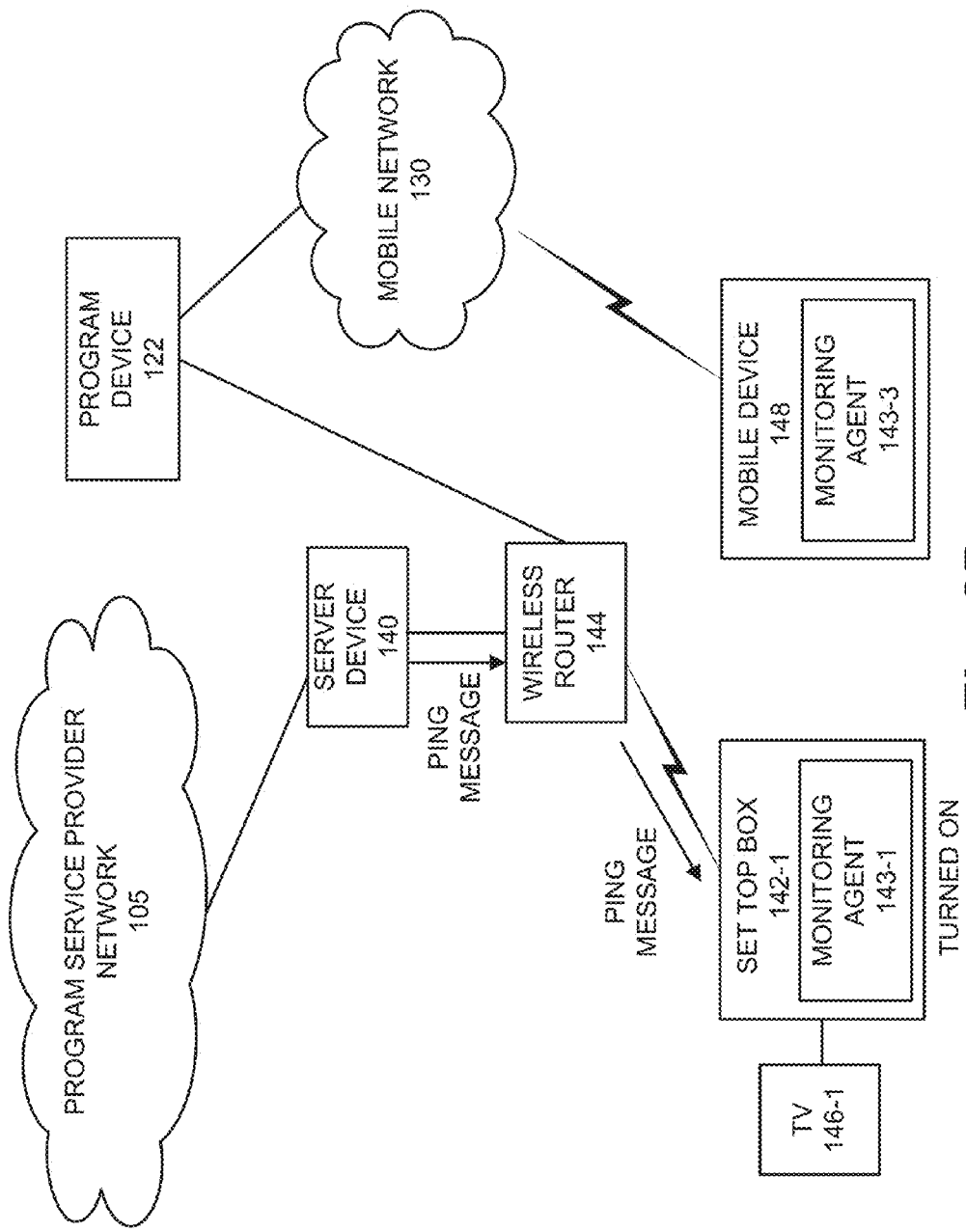

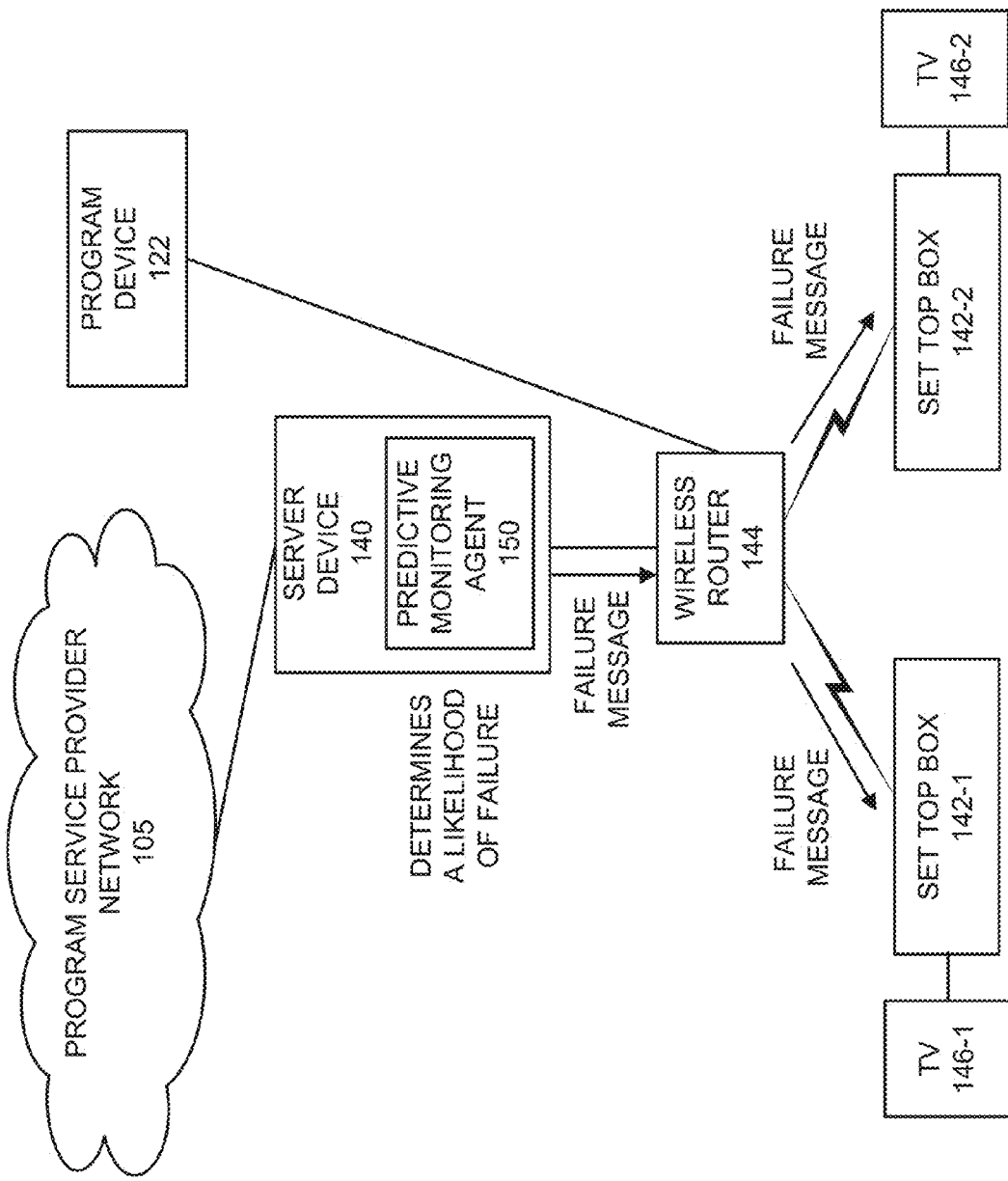

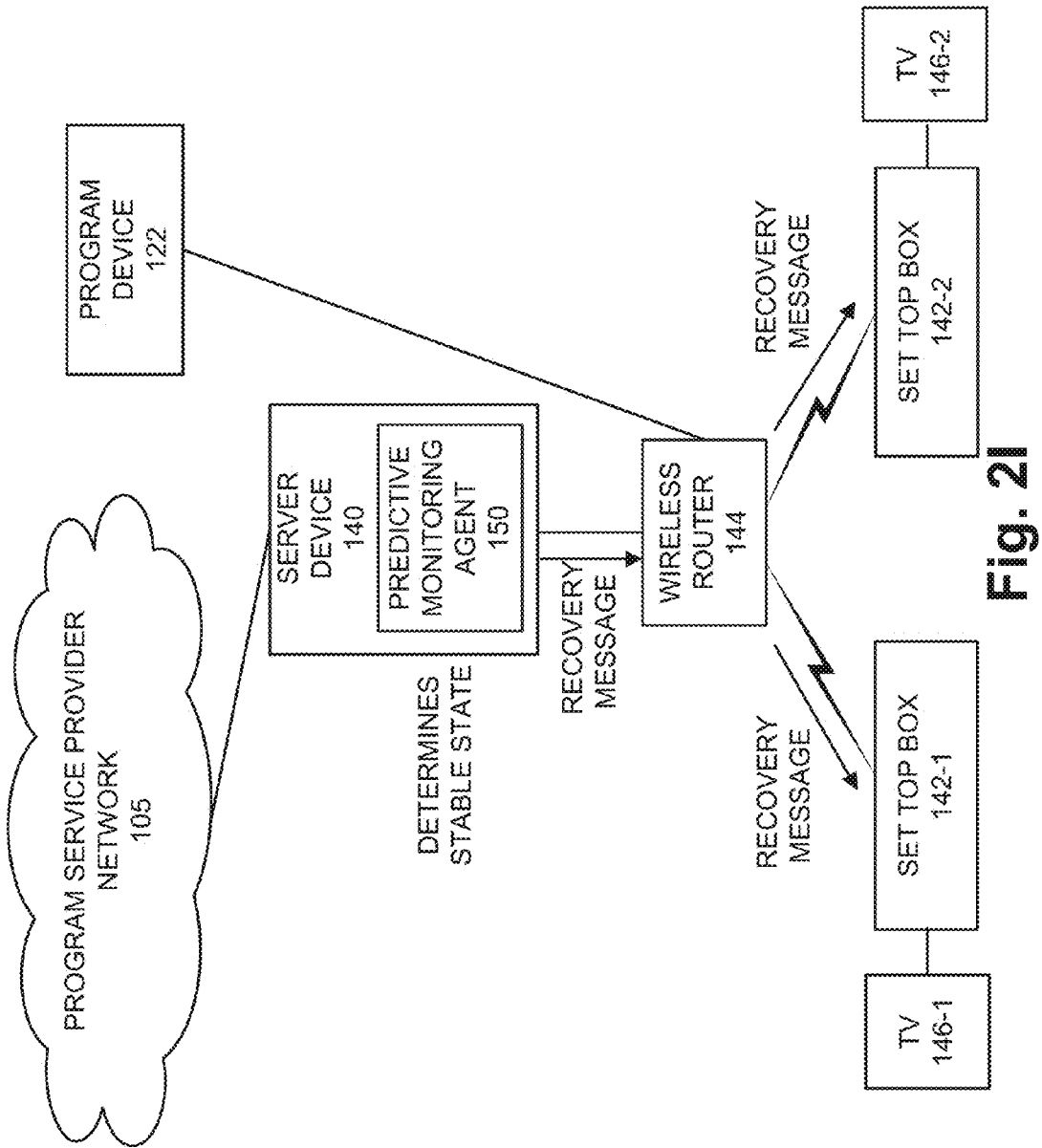

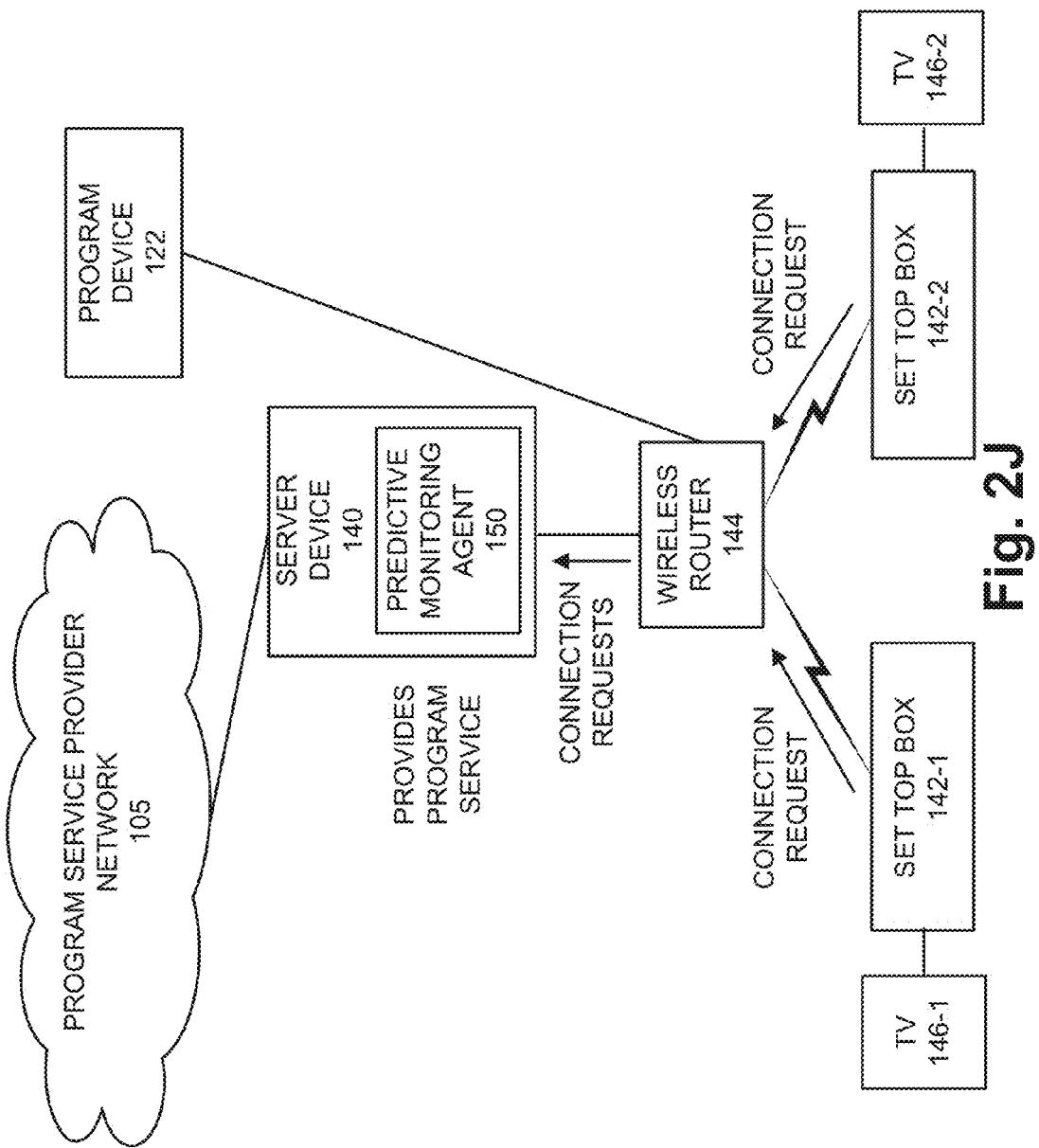

PROGRAM SERVICES INCLUDING ADAPTIVE FAILOVER AND BACKUP SERVICES

BACKGROUND

Streaming and downloading of programs are popular delivery methods for providing the programs to users. A content delivery network (CDN) (also known as a content distribution network) is typically used for streaming and/or downloading the programs. The content delivery network stores the programs and services user requests for the programs.

BRIEF DESCRIPTION OF THE DRAWINGS

FIG. 1 is a diagram illustrating an exemplary environment in which exemplary embodiments of a failover service and a backup service may be implemented;

FIGS. 2A-2F are diagrams that illustrate exemplary scenarios pertaining to an exemplary embodiment of a monitoring agent and a failure service;

FIGS. 2G-2J are diagrams that illustrate an exemplary scenario pertaining to an exemplary embodiment of a predictive monitoring agent and a failover service;

DETAILED DESCRIPTION OF PREFERRED EMBODIMENTS

Figure 2C:
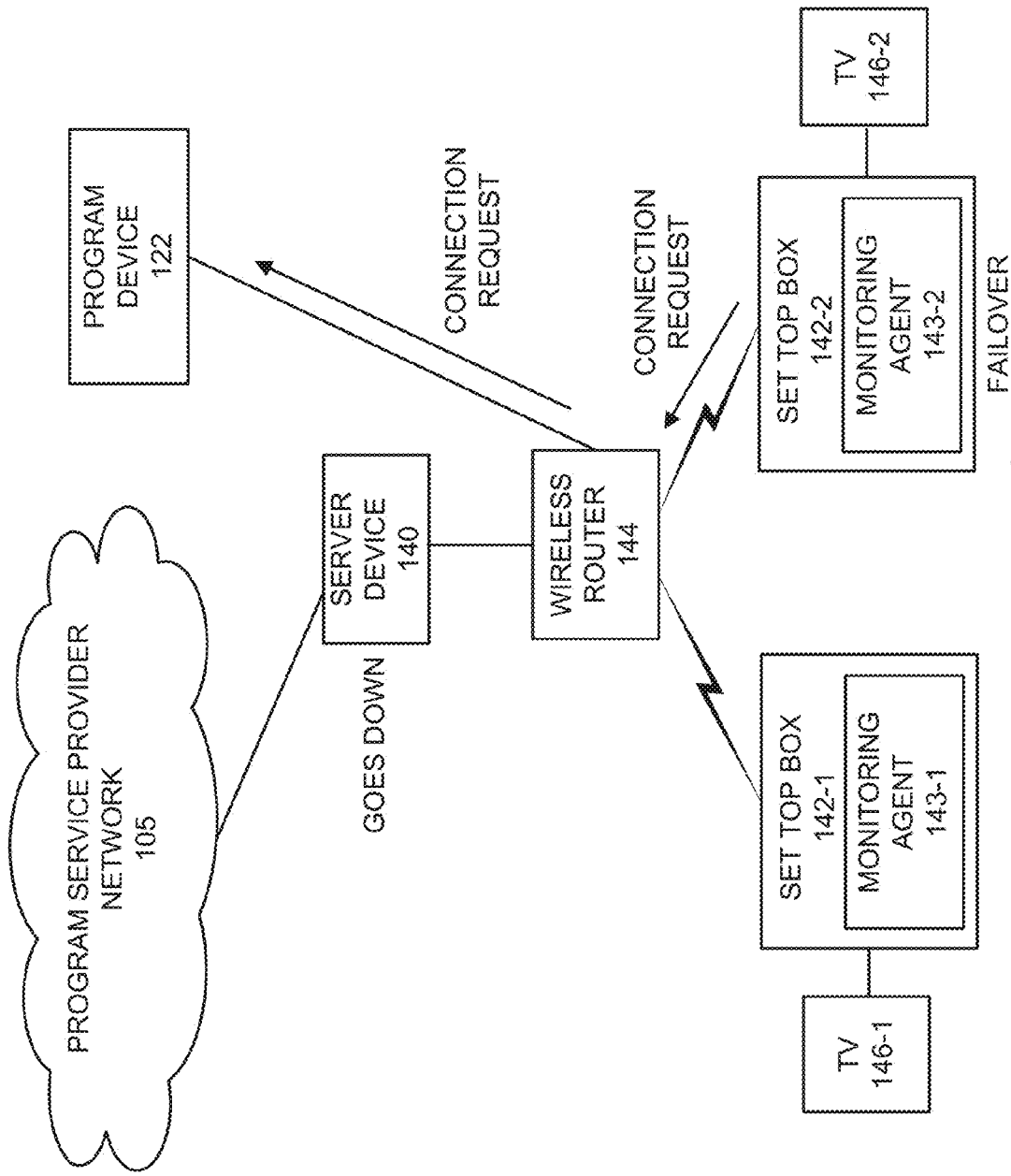

The following detailed description refers to the accompanying drawings. The same reference numbers in different drawings may identify the same or similar elements. Also, the following detailed description does not limit the invention.

As used herein, the term "program" includes content. For example, content may include a linear television program (e.g., a movie, news, a sports show, a sporting event, a television series, a reality show, premium content (e.g., HBO, etc.)), an on-demand program, a pay-per-view program, music, a pre-recorded program, a live broadcast, a music program, and/or Internet content (e.g., a webcast, content of a web channel, a picture, an article, content from a web site, etc.). A program may also include user content (e.g., a home video, a picture, music, etc.). Additionally, as used herein, the phrase "program service data" includes data pertaining to the program service. For example, program service data may include a recorded program, a schedule for recording a program, and/or user settings. User settings may pertain to display options (e.g. high definition, standard definition, aspect ratio, etc.), search options (e.g., location, city, zip code, etc.), closed caption options (e.g., font style, font color, window color, window opacity, etc.), descriptive video service, digital video recording (DVR) options (e.g., skip options, replay options, etc.), parental control options, guide options (e.g., size, genre, filter, information bar, etc.,), favorite channels, language, sleep timer options, audio options (e.g., surround sound, dynamic range, etc.), reminders, notification options (e.g., caller ID, etc.), and other forms of customizations pertaining to the program service (e.g., widget settings, program recommendation settings, popup alerts options, a backup service settings, etc.). User settings may be user-specific, user device-specific, and/or some other factor-specific (e.g., locale of use, time of day, by recorded program, etc.).

A television service provider (e.g., a multiple system operator (MSO)) may offer a program service for programs. The program service may be a subscription-based program service that delivers programs to a user. The MSO may offer the program service and provide a server device (e.g., an in-home video server) for the user. The server device may include multiple tuners and is able to service various types of user devices in the user's residence or other suitable locale. For example, the user may use various types of user devices, such as for example, a set top box, a smart television, and/or mobile devices (e.g., a smartphone, a tablet, etc.). The server device may provide other program services, such as record and store programs on behalf of the user, store a schedule for recording a program, offer an electronic programming guide (EPG), store user settings, etc. Program devices of an MSO network may provide the program service to the server device, which in turn, is provided to the user via the user device.

Additionally, for example, the MSO may allow access and use of the program service via another network (e.g., a cloud network, etc.). According to this framework, the user may access and use the program service without the use of the server device. For example, the user device may access the network via another communication path. The network includes program devices (e.g., cloud devices, etc.) that provide the program service. By way of further example, the user device may access and use the network via a wireless router (e.g., an in-home wireless router, etc.) or via a mobile network (e.g., a Long Term Evolution (LTE) network, the Internet, etc.).

Despite the availability of multiple communication paths to the program service, the user may experience delays in the program service if the server device to which the user is connected goes down for whatever reason. For example, the user device may take some time to discover that the server device is down before attempting to establish an alternative communicative link. As an example, when the server device is up and running, the server device may ping the user device. The ping message (e.g., a hello message) may indicate to the user device that the server device is available. The server device may send ping messages periodically to the user device.

According to the above process, however, there may be various circumstances in which the user device unnecessarily attempts to access the program service via the server device after the server device has gone down. Described below are some exemplary scenarios pertaining to this issue. For example, according to one scenario, assume that the user device is turned off and does not receive the ping message. Once the user device is subsequently turned on (e.g., by the user), the user device blindly attempts (e.g., without having received a ping message) to establish a communicative link with the server device, even when the server device is currently down. According to another scenario, assume that the user device is turned on, but for some reason does not receive the ping message (e.g. due to a network problem the ping message is lost, etc.), or alternatively, receives the ping message, but the server device goes down subsequent to receiving the ping message. Under such circumstances, even though the user device is turned on and may recognize (e.g., proximate to the time the server device goes down) that the communicative link with the server device has gone down, the user device blindly attempts to reestablish a communicative link with the server device since the user device is unaware that the failure of the communicative link is due to the server device having gone down subsequent to sending the ping message.

In view of the above scenarios, the user device is delayed in providing the program service to the user. Depending on the number of attempts to reestablish the communicative link with the server device, back-off periods if any, recognizing that the server device is down and subsequently establishing a communicative link to the program service without the server device, the delay may be, for example, a couple to several minutes.

Other types of scenarios may also be considered in which the user device attempts to reestablish the communication link to the program service. For example, the user device may initially connect to a program device of a cloud network, bypassing the server device, to receive the program service. Subsequently, the program device goes down, and the user device blindly attempts to reestablish a communicative link with the program device. According to such circumstances, the user device may delay in attempting to establish a communicative link with the server device. According to even other scenarios in which there is only one network that provides the program service, the user device may experience a delay in providing the program service when one communication path (e.g., via the server device, etc.) to the program service is not working.

According to an exemplary embodiment, the user device includes a monitoring agent. The monitoring agent facilitates a failover service. According to an exemplary embodiment, the monitoring agent manages the current status of the server device with respect to the user device, as well as other user devices. For example, assume that the user device determines that the server device is down and/or unavailable (e.g., unreachable), the monitoring agent may share this information with other monitoring agents of other user devices. In turn, according to a failover process, another user device may avoid attempting to establish or reestablish a communicative link with the server device. Rather, the user device may more expeditiously establish a communicative link with the program service without traversing the server device. According to another exemplary embodiment, the monitoring agent manages the current status of a program device (e.g. a cloud device, etc.). For example, assume that the user device determines that the program device is down and/or unavailable, the monitoring agent may share this information with other monitoring agents of other user devices. In turn, according to a failover process, another user device may avoid attempting to establish or reestablish a communicative link with the program device. Rather, the user device may more expeditiously establish a communication link with the server device. As a result, the user device may minimize any delay in providing the program service to the user. The monitoring agent is described further below.

Turning to another aspect of this description, according to an exemplary embodiment, the server device includes a predictive monitoring agent. The predictive monitoring agent facilitates a failover service. According to an exemplary embodiment, the predictive monitoring agent predicts when disruption of the program service is likely to occur.

For example, the predictive monitoring agent predicts the disruption based on disruption indicators (e.g., temperature of hardware, system log files, a scheduled update, etc.), as described further below. In response to a prediction of a disruption, the predictive monitoring agent generates a failure message that indicates that disruption of the program service is likely or certain to occur. The server device transmits the failure message to a user device (e.g., set top box, mobile device, etc.). In turn, the user device may connect to the program service without the use of the server device. Assuming the disruption occurs but is subsequently repaired, the predictive monitoring agent determines that the server device is in a stable state and available to provide the program service. In response to this determination, the predictive monitoring agent generates a recovery message that indicates that the server device is up and/or available to provide the program service. The server device transmits the recovery message to the user device. The user device may connect to the program service via the server device. The predictive monitoring agent is described further below.

Turning to another aspect of this description, as previously described, the server device may store program service data stemming from the program service. For example, the server device may store recordings of programs, schedules for recordings, and user settings pertaining to the program service. Unfortunately, the user may temporarily lose access and use of the program service data if the server device is temporarily down and/or unavailable for any reason. This is particularly true when the program service data is not stored elsewhere. Additionally, in the event that the server device cannot be repaired and a new server device is installed, the user permanently loses the program service data.

Although in the exemplary environment previously described, the user may access the program service via an alternate communication path (e.g., that does not include the server device), the program devices may not store the same program service data as is stored on the server device. For example, the user may be able to record and store a program (e.g., a television show) via the server device. Additionally, the user may be able to record and store another program (e.g., a movie) via a cloud device. By way of another example, user settings stored on the server device may be different than user settings stored on the cloud device.

According to an exemplary embodiment, the program service includes a back-up service. The backup service provides that the server device updates the network device (e.g., the cloud device) with program service data. Additionally, the backup service provides that the network device updates the server device with program service data. According to an exemplary embodiment, the back-up service provides for automated backups and user-initiated back-ups. According to an exemplary embodiment, the back-up service allows the user to configure settings pertaining to the back-up service.

According to an exemplary embodiment, the back-up service includes a restore service. The restore service includes loading the program service data on a new server device in the event that the server device is replaced. Additionally, the restore service includes loading the data on a new network device in the event that the network device is replaced. The back-up service is described further below.

FIG. 1 is a diagram illustrating an exemplary environment 100 in which exemplary embodiments may be implemented. As illustrated, environment 100 includes a program service provider network 105, a network 120 that includes a program device 122, and a mobile network 130. As further illustrated, environment 100 includes a server device 140, a set top box 142, a wireless router 144, a television 146, and a mobile device 148. Environment 100 may be implemented to include wired, optical, and/or wireless connections among the devices and the network illustrated. A connection may be direct or indirect and may involve an intermediary device and/or an intermediary network not illustrated in FIG. 1. Additionally, the number, type (e.g., wired and wireless), and the arrangement of connections between the devices and the networks of environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. By way of further example, program device 122 may be implemented as multiple cloud devices and/or set top box 142 and wireless router 144 may be combined into a single device.

Additionally, or alternatively, environment 100 may include additional networks, fewer networks, and/or differently arranged networks, than that illustrated in FIG. 1. For example, program service provider network 105 and network 120 may be combined into a single network, etc. In this regard, although a program service is described in relation to respective networks, such as program service provider network 105 and network 120, the program service generally relates to the same program service. For example, a service provider may offer different program services via different networks under the guise of a single program service.

The types of devices and the types of networks in environment 100 are also exemplary. For example, environment 100 may include a desktop computer, a monitor, an intermediary network, etc. Also, according to other embodiments, one or more functions and/or processes described as being performed by a particular device may be performed by a different device, or some combination of devices.

Program service provider network 105 includes a network that provides access to a program service. Generally speaking, program service provider network 105 may be implemented as a satellite-based network, a terrestrial-based network, or a combination thereof. Program service provider network 105 may be implemented to include a television distribution network. For example, the television distribution network may be implemented to deliver programs using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, program service provider network 105 may include various types of program distribution devices and other types of devices that contribute to the program service, such as, billing devices, security devices, customer profile devices, and application server devices (not illustrated). For example, program service provider network 105 includes a program repository that stores programs and a program delivery network to service program requests. According to an exemplary implementation, program service provider network 105 provides programs to users that subscribe to a television service. Additionally, or alternatively, program service provider network 105 may provide programs to users that subscribe to other types of services, such as a mobile service or an Internet service. By way of further example, program service provider network 105 may include super headend (SHE) devices, video hub office (VHO) devices, video serving office (VSO) devices, an optical line termination (OLT) devices, routers, gateway devices, program server devices, interactive programming guide devices, load balancer devices, optical network termination (ONT) devices, switching devices, splitter devices, passive optical network (PON) devices, policy management devices, web servers, etc.

Network 120 includes a network that provides access to the program service. According to an exemplary implementation, the program service includes a cloud service. Network 120 may be implemented as a public network, a private network, a wired network, or a wireless network. By way of further example, network 120 may be implemented as an IP network, a wide area network (WAN), a metropolitan area network (MAN), a portion of the Internet, a cloud network, a program streaming network, some combination thereof, etc.

Program device 122 includes a network device that provides the program service. For example, program device 122 may provide IPTV, downloading, and/or streaming of programs to users of mobile devices (e.g., mobile device 148) and users of non-mobile devices (e.g., set top box 142 and television 146). Program device 122 may include a DVR service to record programs.

According to an exemplary embodiment, program device 122 includes a backup agent (not illustrated). The backup agent provides a backup service. The backup agent updates program service data between server 140 and program device 122. For example, the program service data includes recorded programs, schedules to record programs, and user settings. In this way, the program service data stored on program device 122 is consistent with (e.g., the same as) the program service data stored on server 140. According to other implementations, however, the program service data may not be exactly the same. For example, the program service may not offer the same user settings between program device 122 and server device 140. By way of further example, a parental control setting may be available relative to server device 140 but not available relative to program device 122. According to such an implementation, the program agent of program device 122 may not store the parental control setting. However, the user may configure the parental control setting for server device 140 either directly with server device 140 or via program device 122. According to the latter case, the backup agent may simply pass the user setting (e.g., the parental control setting) to server device 140 based on filtering system According to an exemplary embodiment, the backup agent provides a restore service. For example, assume server device 140 is replaced due to hardware failures. The backup agents of program device 122 and a new server device 140 may cooperatively provide a restore service in which the program service data stored on program device 122 is stored on the new server device 140. In this way, a user does not lose any program service data due to the installation of new server device 140.

According to an exemplary embodiment, the backup agent provides for user settings that are configurable by the user. Program device 122 may include user interfaces that allow the user to use and configure the backup service. For example, the user may set the frequency of backups, select which recorded programs are to be backed-up and which recorded programs are not to be backed-up, which user settings are to be backed-up and which user settings are not to be backed-up, privileges of access to recorded programs, as well as other settings, as described further below. The backup agent is described further below.

Program device 122 may be implemented to include a repository device (e.g., a mass storage device). For example, program device 122 may include a database management system (DBMS) that supports, among other things, a database that stores the program service data.

Mobile network 130 includes a wireless network. The wireless network may be implemented using various wireless architectures and/or technologies, such as a cellular network, a 3rd Generation (3G) network, a 4th Generation (4G) network, etc. By way of further example, mobile network 130 may be implemented as a Long Term Evolution (LTE) network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Evolution Data Optimized (EV-DO) network, and/or another type of wireless network (e.g., an LTE Advanced network, or future generation wireless network architecture).

Server device 140 includes a device that provides the program service to end user devices. For example, server device 140 receives programs from program service provider network 105 and distributes programs to end user devices (e.g., set top box 142, TV 146, and mobile device 148). Server device 140 may be implemented as a media server device. Server device 140 may include tuners. For example, server device 140 receives channels (e.g., Quadrature Amplitude Modulation (QAM) channels or other type of modulated and/or encoded channels) and tunes to programs using the tuners. Server device 140 may also receive programs via other types of delivery systems (e.g., streams, downloads, etc.).

Server device 140 includes a DVR service that allows the user to record a program. Additionally, for example, the DVR service allows the user to upload or store user content (e.g., home videos, pictures, music, articles, documents, web pages, etc.) on server device 140. The DVR service allows the user to view and/or listen (e.g., on-demand) to a program stored by server device 140.

Server device 140 stores program service data. According to an exemplary implementation, program service data may be accessed by the user after a log-in procedure so as to protect the program service data pertaining to the user. Server device 140 includes a user interface to allow the user to access, view, manage, use, etc., the program service data.

According to an exemplary embodiment, server device 140 includes a predictive monitoring agent (not illustrated). The predictive monitoring agent provides a failover service. For example, as previously described, the predictive monitoring agent predicts when disruption of the program service is likely or certain to occur. By way of example, the predictive monitoring agent may predict that server device 140 is approaching a failure state, determine that a communicative link failure between server device 140 and program service provider network 105 may occur (e.g., based on the state of the communicative link, such as flapping, etc.), and/or other conditions or states relative to server device 140, a communication link, etc., that may prevent the program service. Additionally, for example, the predictive monitoring agent may predict or identify conditions or states that would not necessarily result in a complete loss of the program service, but would negatively impact or degrade the program service. For example, the predictive monitoring agent may predict or identify when the bandwidth of a communicative link prohibits delivery of a program in high definition or the presence of signal errors that cause video and/or audio degradation of the program. Additionally, the predictive monitoring agent may identify other events (e.g., a scheduled software update, etc.) that will cause a disruption of the program service.

The predictive monitoring agent may predict and/or identify various states pertaining to hardware and software resident on server device 140, and the network (e.g., a communicative link, another device, etc.). Described below are some exemplary techniques and models that may be used. According to an exemplary implementation, the predictive monitoring agent predicts a disruption based on a hardware sensor. The hardware sensor records temperatures and voltages relative to a system board (e.g., a motherboard, a network interface card, a card with tuners, etc.) and stores this information in a hardware log. Predictive monitoring agent analyzes the hardware log to determine whether a disruption may occur. For example, the predictive monitoring agent may identify a hardware disruption signature (e.g., temperature values over time, voltage levels, etc.) based on an analysis of historical hardware logs that indicated a potential disruption, which ultimately occurred. The predictive monitoring agent may predict a disruption based on a comparison between the hardware disruption signature and a current hardware log.

According to another exemplary implementation, the predictive monitoring agent predicts a disruption based on error logs associated with software. For example, server device 140 may generate system activity logs that indicate the current operational state of software resident on server device 140. The system activity logs may include error logs when errors/failures occur within running software. Predictive monitoring agent may store historical system activity logs and use these historical logs to identify a software disruption signature. Depending on the number and type of software resident on server device, the predictive monitoring agent may store one or multiple signatures. Predictive monitoring agent may use the software disruption signature as a comparative to the current system activity logs. Based on the analysis and comparison, predictive monitoring agent may predict a disruption.

According to yet another exemplary implementation, the predictive monitoring agent predicts a disruption based on various system parameters, such as memory (e.g., memory consumption), processor (e.g., processor load), disk (e.g., temperature, number of scan errors, etc.), network traffic, etc. For example, the predictive monitoring agent may use a Multivariate State Estimation Technique (MSET), a Markov chain-based model, a Bayesian network model, mean time between failures (MTBF), machine learning, etc., to prognosticate disruption. The predictive monitoring agent may use various metrics (e.g., true positives (i.e., predicts and failure occurs), false positives (i.e., predicts and no failure occurs), false negatives (i.e., no prediction but failure occurs), precision (e.g., ratio of correctly predicted failures to predicted failures (i.e., true and false positives)), sensitivity (e.g., ratio of correctly predicted failures to the summation of true positives and false negatives), recall (e.g., ratio of correctly predicted failures to total number of failures that occurred), etc.) and various data (e.g., error logs, historical data, system activity logs, schedule, etc.) to predict or identify a disruption. The predictive monitoring agent may assign a probability value (e.g., 0.5, 0.62, 1, etc.) to a predicted event. The user device (e.g., set top box 142, etc.) may use the probability value as a basis to ignore or accept the predicted disruption. For example, the program service may allow the user to configure the user device to only accept, for example, a failure message for purposes of invoking a switchover if the probability value meets a certain probabilistic threshold value. Additionally, or alternatively, the user may configure predictive monitoring agent, via a user setting, to transmit a failure message only if the probability value is above a certain threshold value.

According to an exemplary embodiment, in response to predicting or identifying a disruption, the predictive monitoring agent informs user devices (e.g., set top box 142, mobile device 148) of the possible disruption. For example, the predictive monitoring agent generates a message (e.g., a failure message). The predictive monitoring agent transmits the message to a user device (e.g., set top box 142, mobile device 148). Subsequent to informing the user devices, the predictive monitoring agent determines when a condition or state is stable. For example, predictive monitoring agent may analyze current system activity logs associated with hardware and software of server device 140, and network logs that indicate current states of communicative links, other network devices, etc. Additionally, in the event of an actual failure, predictive monitoring agent may consider event logs that indicate measures performed that are responsive to the occurrence of a failure (e.g., a reboot log, etc.). In response to determining that that the condition is stable, the prediction monitoring agent generates a message (e.g., a recovery message). The predictive monitoring agent transmits the message to the user device. The predictive monitoring agent is described further below.

According to an exemplary embodiment, server device 140 includes a backup agent (not illustrated). The backup agent provides a backup service, which complements the backup service previously described in relation to program device 122. The backup agent updates program service data between server 140 and program device 122. The backup agent includes user settings that are configurable by the user. For example, the user may set the frequency of backups, select which recorded programs are to be backed-up and which recorded programs are not to be backed-up, which user settings are to be backed-up and which user settings are not to be backed-up, privileges of access to recorded programs, as well as other settings, as described further below. The backup agent is described further below.

Set top box 142 may be implemented as a client device, a thin client device, a converter box, a receiver device, a tuner device, a digibox, an IPTV set top box, or some combination thereof. According to an exemplary embodiment, set top box 142 includes a monitoring agent (not illustrated). The monitoring agent provides a failover service. According to an exemplary embodiment, the monitoring agent manages the current status (e.g., up, down, unavailable, etc.) of server device 140 with respect to set top box 142. For example, the monitoring agent identifies the status of server device 140 based on a message (e.g., a failure message, a ping message, or some other message indicating a status) received from server device 140. Additionally, the monitoring agent identifies the status of server device 140 based on the ability of set top box 142 to establish and maintain a communicative link with server device 140. As an example, if set top box 142 is unable to establish or reestablish a communicative link with server device 140, the monitoring agent determines that server device 140 is down and/or unavailable. Conversely, if set to box 142 has an active communicative link with server device 140, the monitoring agent determines that server device 140 is up and/or available.

According to an exemplary embodiment, the monitoring agent may store status data indicating the status of server device 140. For example, the status data may indicate a status (e.g., up, down, available, unavailable) and a date and timestamp. The monitoring agent may also store message data. For example, the message data may indicate a type of message (e.g., ping message, a failure message, a recovery message, etc.) and a date and timestamp. The message data may also include a received message (e.g., a ping message, etc.). According to an exemplary embodiment, the monitoring agent may share status data and/or message data with another monitoring agent. According to an exemplary implementation, the monitoring agent may share status data and/or message data according to a reactive approach. For example, the monitoring agent may share data (e.g., status data and/or message data) in response to a request from another monitoring agent, in response to detecting that another monitoring agent is active (e.g., was recently turned on/powered on or just joined the in-home network (e.g., a monitoring agent of mobile device 148). According to another exemplary implementation, the monitoring agent may share data according to a proactive approach. For example, the monitoring agent may share data in response to identifying a change in status of server device 140 (e.g., from up to down or down to up). The monitoring agent may broadcast the data. For example, the monitoring agent may broadcast the data via a particular or a dedicated port so that any monitoring agent may listen and receive the data via the particular or the dedicated port.

According to a failover service, for example, if server device 140 is down or unavailable, the monitoring agent causes the user device (e.g., set top box 142, mobile device 148) to establish a communicative link with the program service without traversing server device 140. According to another exemplary embodiment, the monitoring agent manages the current status of a program device (e.g. a cloud device, etc.) in a manner similar to that of server device 140. As a result, the monitoring agent may minimize any delay in providing the program service to the user.

According to another exemplary embodiment, the monitoring agent may invoke the failover service in response to other considerations. For example, assume that a user of mobile device 148 begins to exit his or her home. The monitoring agent may detect, for example, that the signal strength associated with a connection with wireless router 144 is beginning to weaken. The monitoring agent may compare the signal strength to a threshold value and determine to invoke the failover service. For example, the monitoring agent may establish a connection with program device 122 via mobile network 130 before or close in time after the connection with wireless router 144 is lost. The monitoring agent may also use other data (e.g., geodata) to determine that mobile device 148 is exiting the user's residence. The monitoring agent is described further below.

Wireless router 144 may be implemented as an in-home router device, a broadband router, or a wireless router. Television 146 may be implemented as a non-smart television, a smart television, or some other form of a display device. Mobile device 148 may be implemented as a smartphone, a tablet device, a vehicular communication system (e.g., an infotainment system, etc.), a computer (e.g., a laptop computer, a netbook, a palmtop computer, etc.), or some other type of end user device (e.g., an Internet access device, a game system, etc.). According to an exemplary embodiment, mobile device 148 includes a monitoring agent (not illustrated).

FIGS. 2A-2F are diagrams illustrating exemplary scenarios pertaining to an exemplary embodiment of the monitoring agent and a failover service. According to the scenarios described, server device 140 goes down (e.g., due to a malfunction). However, according to other scenarios, the failover service may be invoked as a result of other circumstances, which may or may not include that server device 140 has gone down. For example, there may be network issues that prevent messages from being transmitted and/or received, an intermediary device (e.g., wireless router 144) has gone down, a communication interface of a user device (e.g., set top box 142, etc.) is malfunctioning, or some combination of these issues.

Referring to FIG. 2A, assume that set top box 142-1 includes a monitoring agent 143-1 and set top box 142-2 includes a monitoring agent 143-2. Also, as illustrated, assume that set top box 142-1 is turned on and set top box 142-2 is turned off. According to an exemplary scenario, server device 140 transmits a ping message. The ping message includes an indication that server device 140 is up/available to provide the program service. According to this example, the ping message is received by monitoring agent 143-1 of set top box 142-1. Monitoring agent 143-1 interprets the ping message. Monitoring agent 143-1 determines, for example, that server device 140 is operational and available to provide the program service.

Referring to FIG. 2B, assume that server device 140 goes down due to a malfunction. In response, set top box 142-1 determines a loss of a communicative link with server device 140. According to this example, set top box 142-1 transmits a connection request to server device 140 so as to reestablish a communicative link with server device 140. However, since server device 140 is down, set top box 142-1 is unable to reestablish the communicative link. As previously described, the reestablishment process may include back-off periods, transmitting a certain number of connection requests, etc. Additionally, depending if server device 140 has exhibited flapping (e.g., fluctuating up and down states), the reestablishment process may adapt to such circumstances. For example, set top box 142-1 may determine that server device 140 is down without transmitting a connection request and/or determine that server device 140 is down over a shorter period of time relative to a time period when flapping is not exhibited.

As a result of the reestablishment process, set top box 142-1 determines, for example, that server device 140 is down and/or unavailable (down/unavailable). In response to such a determination, monitoring agent 143-1 informs other user devices (e.g., set top box 142-2) of the status of server device 140. According to an exemplary implementation, monitoring agent 143-1 generates a server status message. The server status message indicates that server device 140 is down/unavailable. The server status message may also include a date and timestamp indicative of when this determination occurred. Set top box 142-1 transmits the server status message. For example, set top box 142-1 broadcasts the server status message to all user devices (e.g., set top box 142-2, a mobile device, etc.) on a broadcast channel.

As illustrated in FIG. 2B, set top box 142-2 is turned on. For example, set top box 142-2 may have turned on subsequent to set top box 142-1 determining the loss of the communicative link with server device 140. According to this scenario, monitoring agent 143-2 receives and interprets the server status message. Referring to FIG. 2C, in response to the server status message, set top box 142-2 invokes a failover service in which set top box 142-2 establishes a connection with program device 122 without traversing server device 140. Although not illustrated, set top box 142-1 may also establish a connection with program device 122.

Figure 2E:
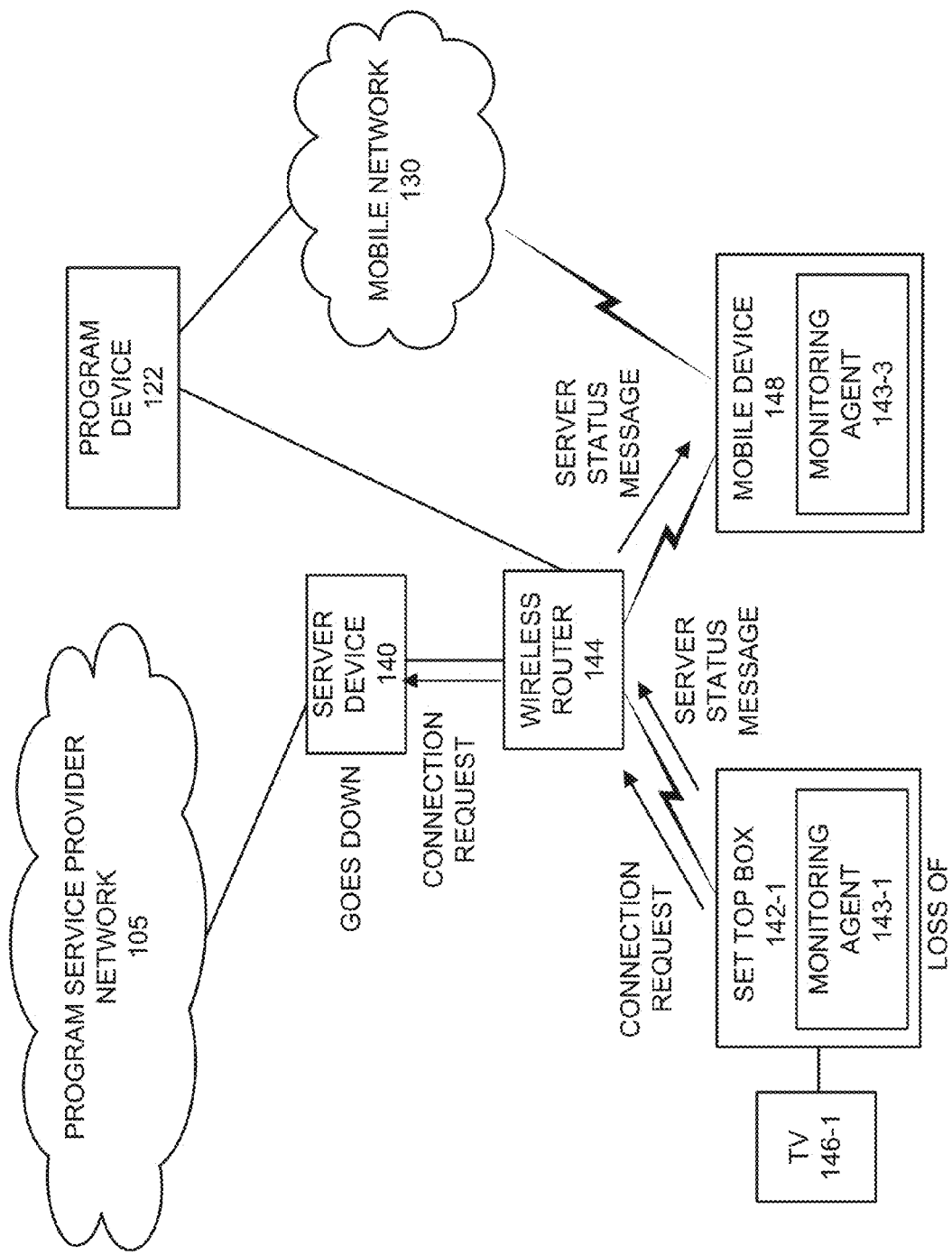
Figure 2F:
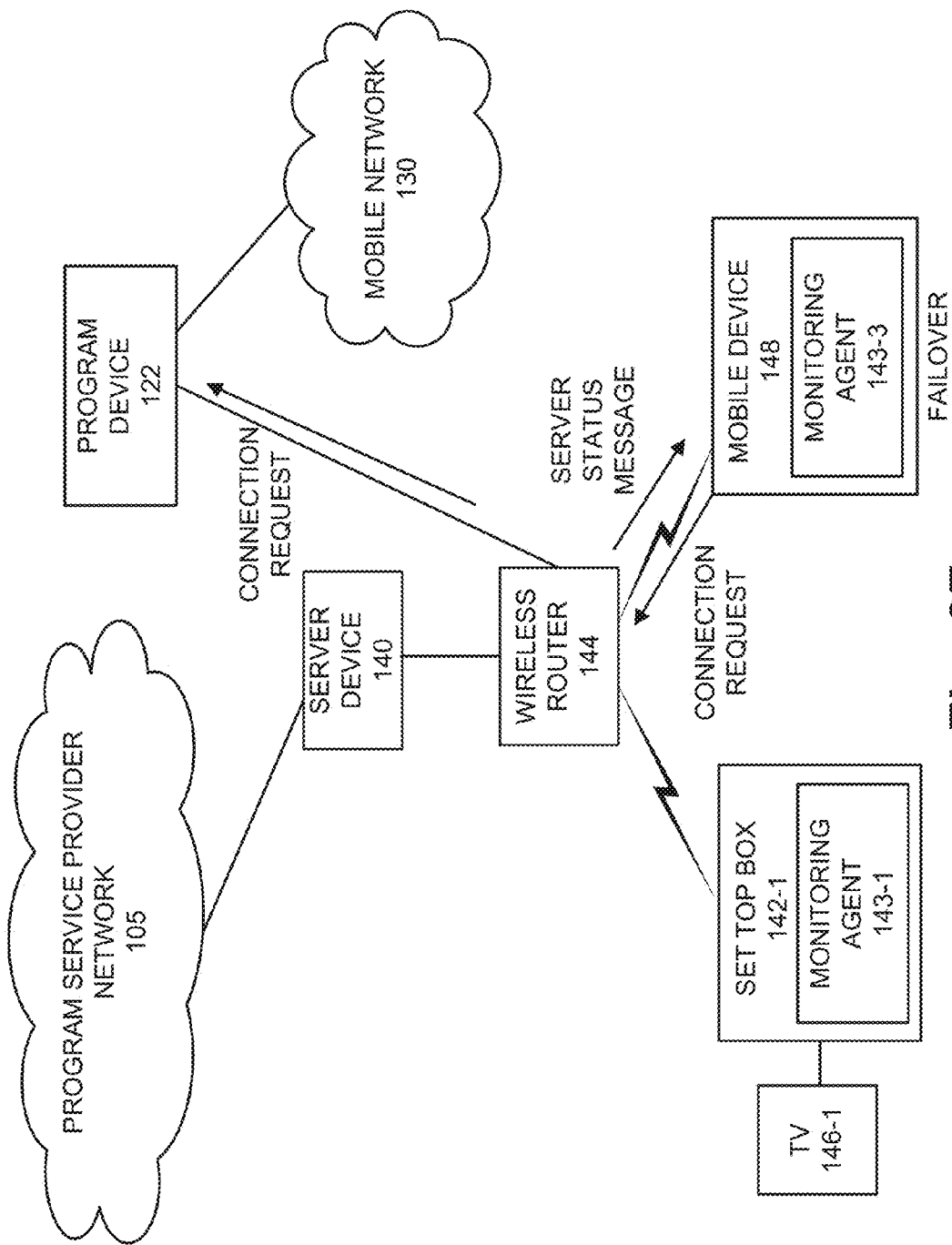

FIGS. 2D-2F illustrate another exemplary scenario pertaining to monitoring agent 143 and the failover service. However, according to this scenario, mobile device 148 is involved. As illustrated, mobile device 148 includes monitoring agent 143-3. Referring to FIG. 2D, assume mobile device 148 is receiving the program service from program device 122 via mobile network 130. For example, a user of mobile device 148 may be outside of a residence at which server device 140 and wireless router 144 is located. In a manner similar to that previously described, server device 140 transmits a ping message, which is received by set top box 142-1, as illustrated in FIG. 2D. Referring to FIG. 2E, subsequently, server device 140 goes down, set top box 142-1 detects a loss of a communicative link with server device 140, and attempts to reestablish a communicative link with server device 140. As a result of a reestablishment process, set top box 142 determines that server device 140 down/unavailable. In response to such a determination, monitoring agent 143-1 of set top box 142-1 generates a server status message. The server status message indicates that server device 140 is down/unavailable. Set top box 142-1 transmits the server status message to other user devices (e.g., mobile device 148, television 146-1).

As further illustrated in FIG. 2E, mobile device 148 is connected to wireless router 144. For example, the user of mobile device 148 may have entered the residence subsequent to set top box 142-1 determining the loss of the communicative link with server device 140. According to an exemplary implementation, mobile device 148 may detect the presence of wireless router 144. Additionally, mobile device 148 may be configured to receive the program service via wireless router 144 and server device 140. For example, a switchover service may be based on relative signal strength between mobile network 130 and wireless router 144. Additionally, or alternatively, mobile device 148 may invoke the switchover service based on historical information. For example, mobile device 140 may use the historical information and determine a likelihood that the user is going to remain in the residence. The historical information may include calendar data associated with the user, connectivity history with a network and mobile device 148, geo-location history, etc. As a simple use case, assume the user returns home from work according to a regular schedule.

According to this scenario, monitoring agent 143-3 receives and interprets the server status message transmitted by monitoring agent 143-1. Referring to FIG. 2F, in response to the server status message, mobile device 148 invokes a failover service in which mobile device 148 establishes a connection with program device 122 without traversing server device 140. Although not illustrated, set top box 142-1 may also establish a connection, which bypasses server device 140, with program device 122.

FIGS. 2G-2J are diagrams illustrating an exemplary scenario pertaining to an exemplary embodiment of a predictive monitoring agent and a failover service. Referring to FIG. 2G, according to the scenario described, a predictive monitoring agent 150 predicts that server device 140 will go down (e.g., due to a malfunction). In response to this prediction, predictive monitoring agent 150 generates a message. For example, the message includes a failure message that indicates server device 140 is predicted to fail. The failure message may include other data, such as a value indicative of the probability of the predicted failure and/or a date and timestamp. The failure message may also include a date and time indicating when server device 140 may recover. For example, predictive monitoring agent 150 may identify a particular type of failure and may predict a recovery time. By way of further example, assume predictive monitoring agent 150 predicts a software problem. Predictive monitoring agent 150 may determine, as a means to resolve the software problem, to reboot. In this regard, predictive monitoring agent 150 may predict a time that server device 140 should be up again based on an average time to execute a reboot. Predictive monitoring agent 150 transmits the failure message to set top boxes 142-1 and 142-2.

Figure 2H:
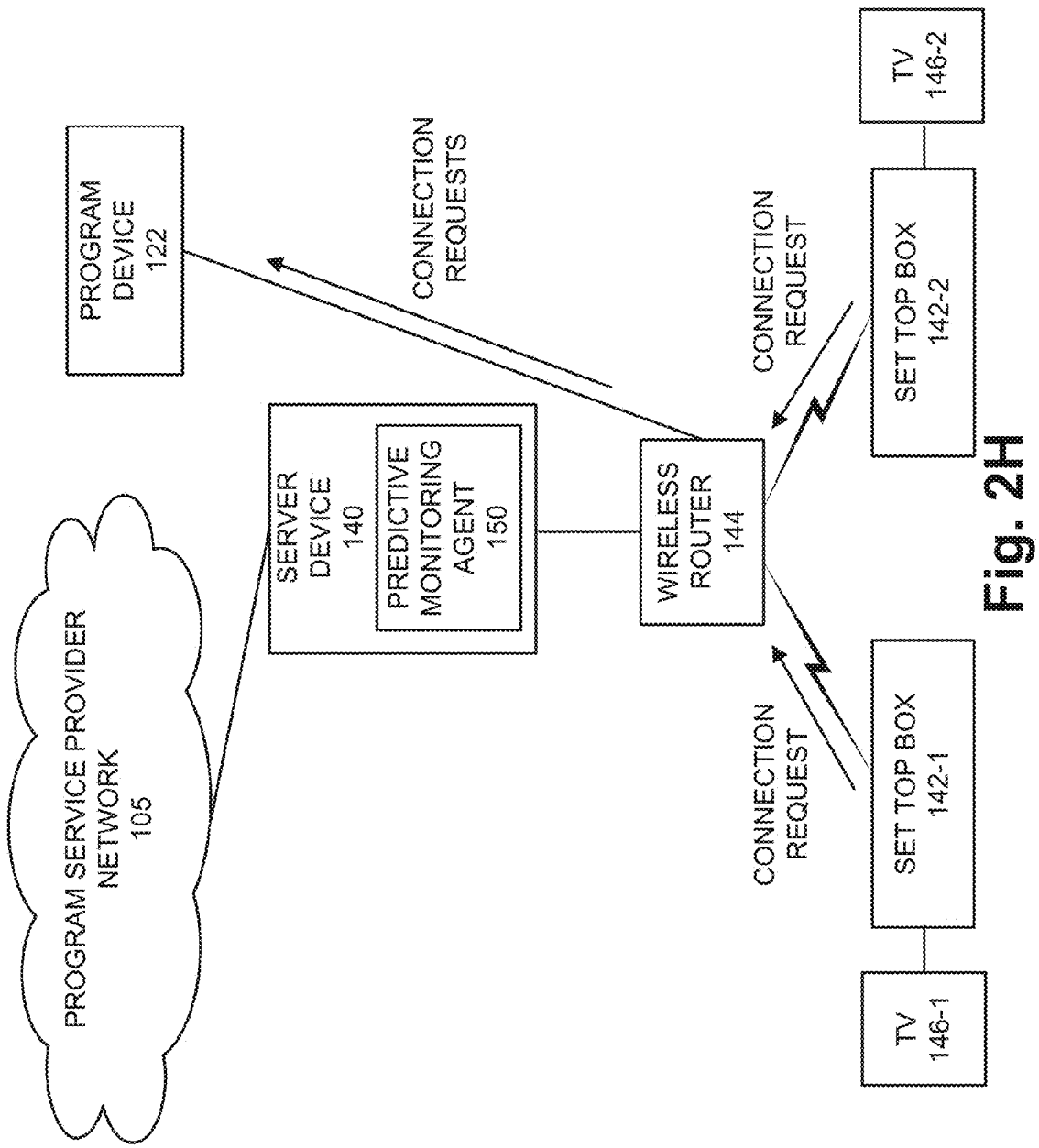

Referring to FIG. 2H, set top boxes 142-1 and 142-2 receive the failure message. In response, set top boxes 142-1 and 142-2 disconnect from server device 140. The disconnection process may be initiated (e.g., transmitting a message) by set top boxes 142-1 and 142-2 or server device 140. Additionally, set top boxes 142-1 and 142-2 each generate and transmit connection requests to program device 122 to obtain the program service and bypass server device 140. Referring to FIG. 2I, assume that a failure occurred. However, subsequent to the failure, server device 140 reboots and enters a normal or stable state. As illustrated, predictive monitoring agent 150 determines that server device 140 is in a stable state. In response, predictive monitoring agent 150 generates a message. For example, the message includes a recovery message that indicates that server device 140 is up and available to provide the program service. The recovery message may also include a date and timestamp. Predictive monitoring agent 150 transmits the recovery message to set top boxes 142-1 and 142-2.

Referring to FIG. 2J, set top boxes 142-1 and 142-2 receive the recovery message. In response, set top boxes 142-1 and 142-2 disconnect from program device 122. Additionally, set top boxes 142-1 and 142-2 each generate and transmit connection requests to server device 140. Server device 140 receives the connection requests and the program service is reestablished between server device 140 and set top boxes 142-1 and 142-2. Predictive monitoring agent 150 logs the failure event and its recovery.

Although FIGS. 2A-2J illustrate exemplary embodiments of monitoring agent 143, predictive monitoring agent 150, and the failover service, in relation to distinct scenarios, according to other scenarios, monitoring agent 143 and predictive monitoring agent 150 may both be involved. For example, assume server device 140 includes predictive monitoring agent 150. However, predictive monitoring agent 150 fails to predict a failure. According to such a scenario, monitoring agent 143 of set top box 142 may invoke the failover service. In this regard, monitoring agent 143 and predictive monitoring agent 150 may operate concurrently in a particular network environment. Additionally, although predictive monitoring agent 150 is illustrated in FIGS. 2G-2J as residing and executing on server device 140, in other embodiments, predictive monitoring agent 150 may reside and execute remotely from server device 140. For example, another device (not illustrated) may include predictive monitoring agent 150 and be connected (e.g., directly, via wireless router 144, via program service provider network 105, etc.) to server device 140

Figure 3A:
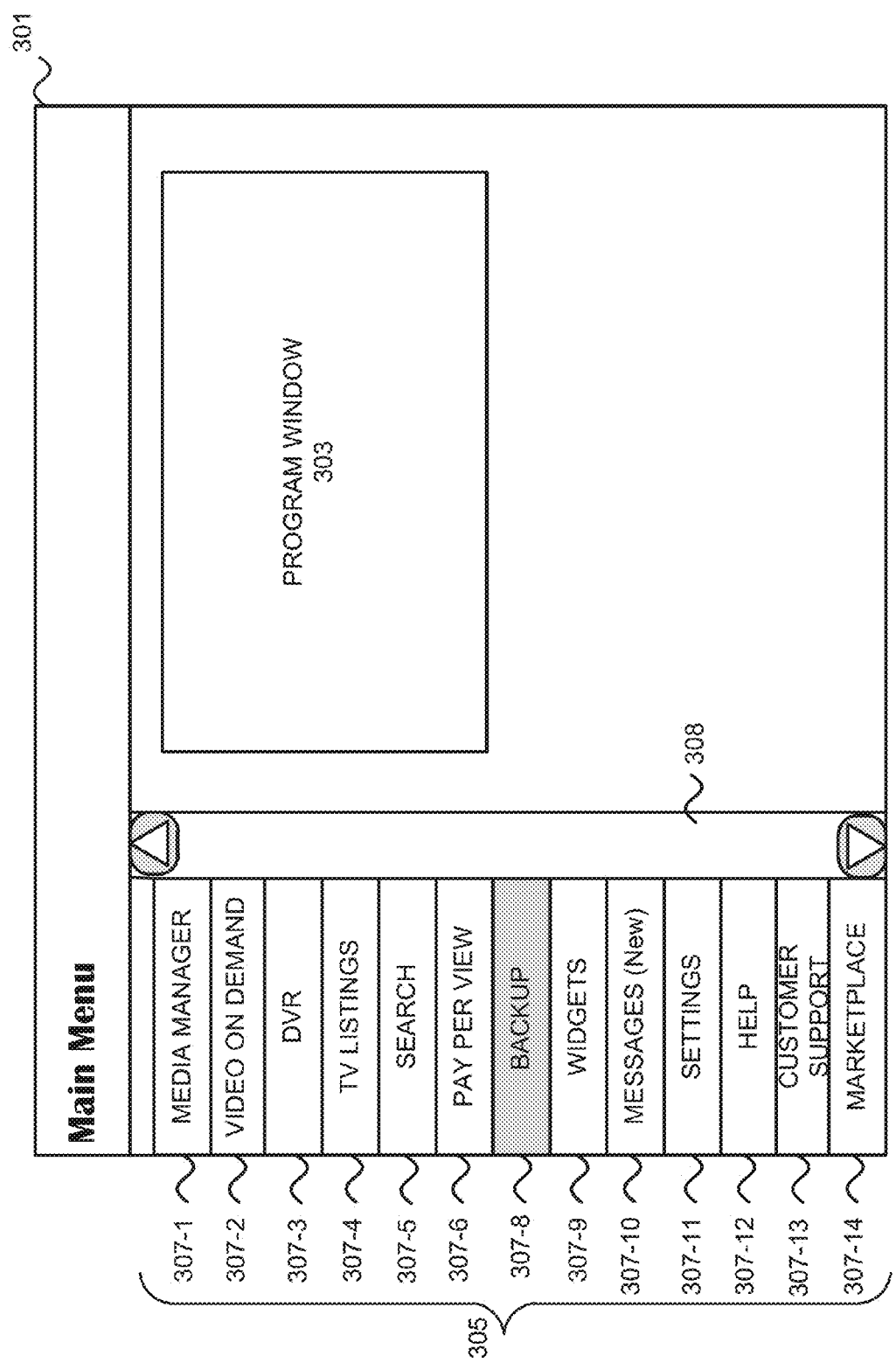
FIGS. 3A and 3B are diagrams illustrating exemplary user interfaces pertaining to the backup service.
Figure 3B:
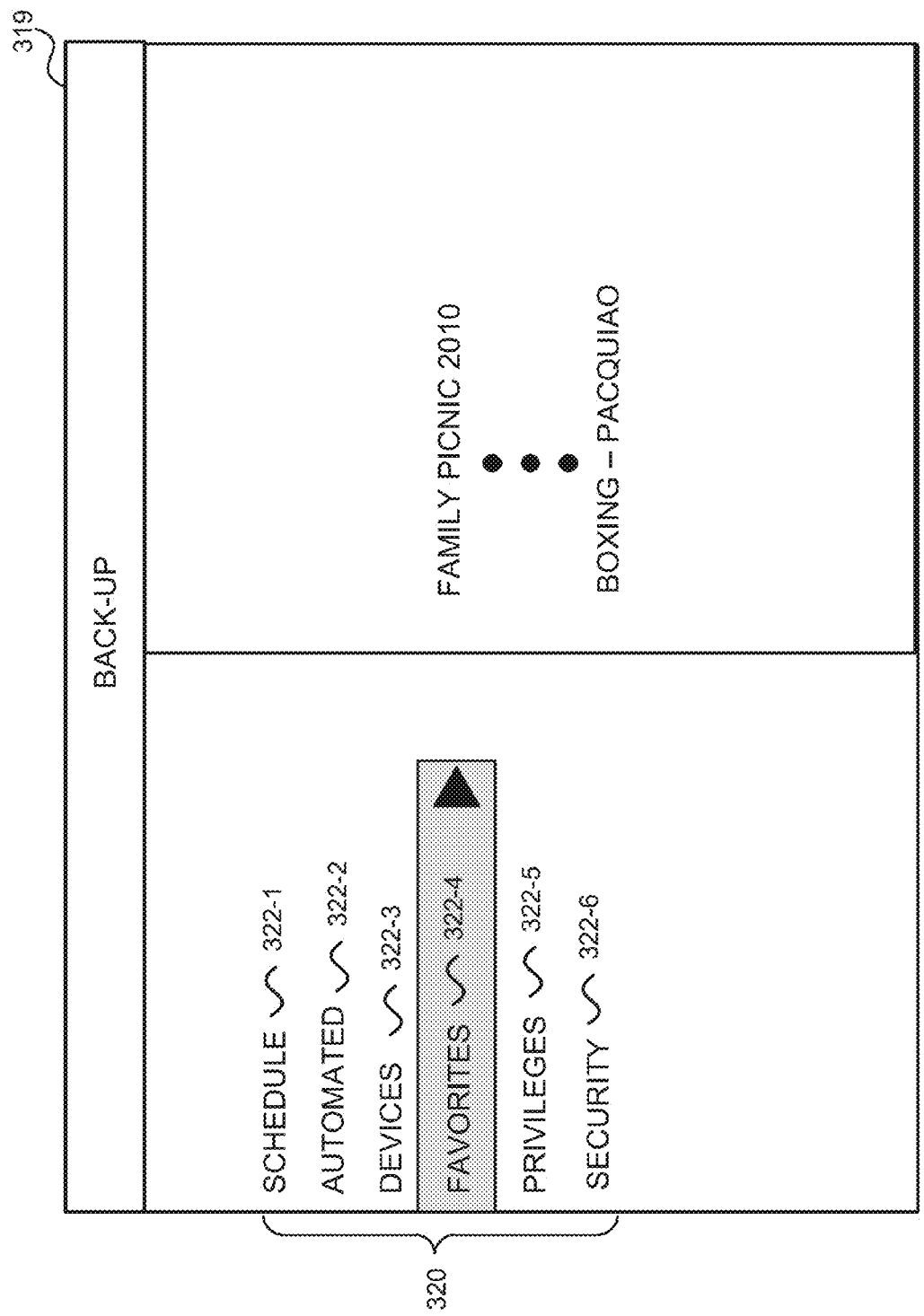

As previously described, according an exemplary embodiment, a backup agent provides a backup service. Additionally, as previously described, the program service may provide user interfaces that allow the user to use and configure the backup service. FIGS. 3A and 3B are diagrams illustrating exemplary user interfaces that allow the user to configure the backup agent/backup service.

FIG. 3A is a diagram illustrating an exemplary user interface 301 that is provided by the program service. For example, user interface 301 may include a main menu. As illustrated, user interface 301 includes a menu 305. Menu 305 includes menu slots 307-1 through 307-14 (also referred to collectively as menu slots 307 or generally as menu slot 307). According to this example, menu slots 307 include interactive elements that provide access to various functions and services, such as media manager, video on demand, DVR, TV listings, search, pay per view, backup service, widgets, messages, settings, help, customer support, and marketplace. A user may access a sub-menu or a sub user interface via one of the menu slots 307. For example, as illustrated in FIG. 3A and indicated by the highlighting of menu slot 307-8 (named "backup"), a user may access settings for the backup service via menu slot 307-8. User interface 301 also includes a program window 303. Program window 303 may be a window within which a program may be displayed while the user accesses and uses menu 305. User interface 301 also includes a scroll bar 308. The user may use scroll bar 308 to access further menu slots 307 (not illustrated).

FIG. 3B is a diagram illustrating an exemplary sub-user interface 319. For example, the user may access user interface 319 via menu slot 307-8. As illustrated in FIG. 3B, user interface 319 includes, among other elements, a menu 320 that provides sub-menus 322-1-322-6 (referred collectively as sub-menus 322 or generally as sub-menu 322). The user may configure various settings via sub-menus 322. Sub-menus 322 are described further below.

Sub-menu 322-1 (named "schedule") allows the user to schedule a backup of the program service data. For example, the user may schedule a backup daily, weekly, etc. Additionally, the user may select a particular time of day (e.g., 1:00 p.m., etc.). Sub-menu 322-2 (named "automated") allows the user to opt for an automated backup. For example, a backup may be invoked anytime a change in the program service data occurs, such as a newly recorded program, a new schedule to record a program, or a change in user settings. According to an exemplary implementation, the MSO may provide an incentive to the user to opt for the scheduled backup or the automated backup. In terms of network resource utilization to support the backup service, the MSO may benefit from the user selecting one option or the other, depending on the user's habit of usage. For example, if the user records multiple programs on a daily basis, a one-time scheduled backup may be beneficial to the MSO in terms of resource usage. Conversely, if the user rarely records programs, but opts for a daily backup, the MSO may unnecessarily waste resources in order to confirm or verify that no change in the program service data has occurred since the last backup. Backup agent may analyze historical data relating to changes in the program service data and provide the user with a recommended setting that optimizes resource utilization and ensures that program service data is backed-up.

Sub-menu 322-3 (named "devices") allows the user to enter user device information. For example, the user may wish to enter device identifiers pertaining to various mobile devices (e.g., a tablet, a smartphone, etc.) that the user may use to configure and/or use the backup service. Sub-menu 322-4 (named "favorites") allows the users to select particular programs that must be backed-up. For example, depending on the amount of storage allocated to the user, backup agent may need to delete certain programs. This setting allows the user to indicate which programs are never to be deleted. As an example, as illustrated in FIG. 3B, the user may wish to permanently save user content (e.g., "family movies") or recorded content (e.g., "Boxing—Pacquiao"). Sub-menu 322-5 (named "privileges") allows the user to identify other users that may access programs that are stored on behalf of the user. For example, the user may indicate that a spouse and his/her child may access "family movies," while for other programs, the user may prevent access and use by other users. Sub-menu 322-6 (named "security") allows the user to enter log-in information (e.g., username and/or password) or other authentication credentials. The backup service may prompt the user for log-in information at various times (e.g., accessing a recorded program, modifying program service data, such as user settings, etc.).

Figure 4A:
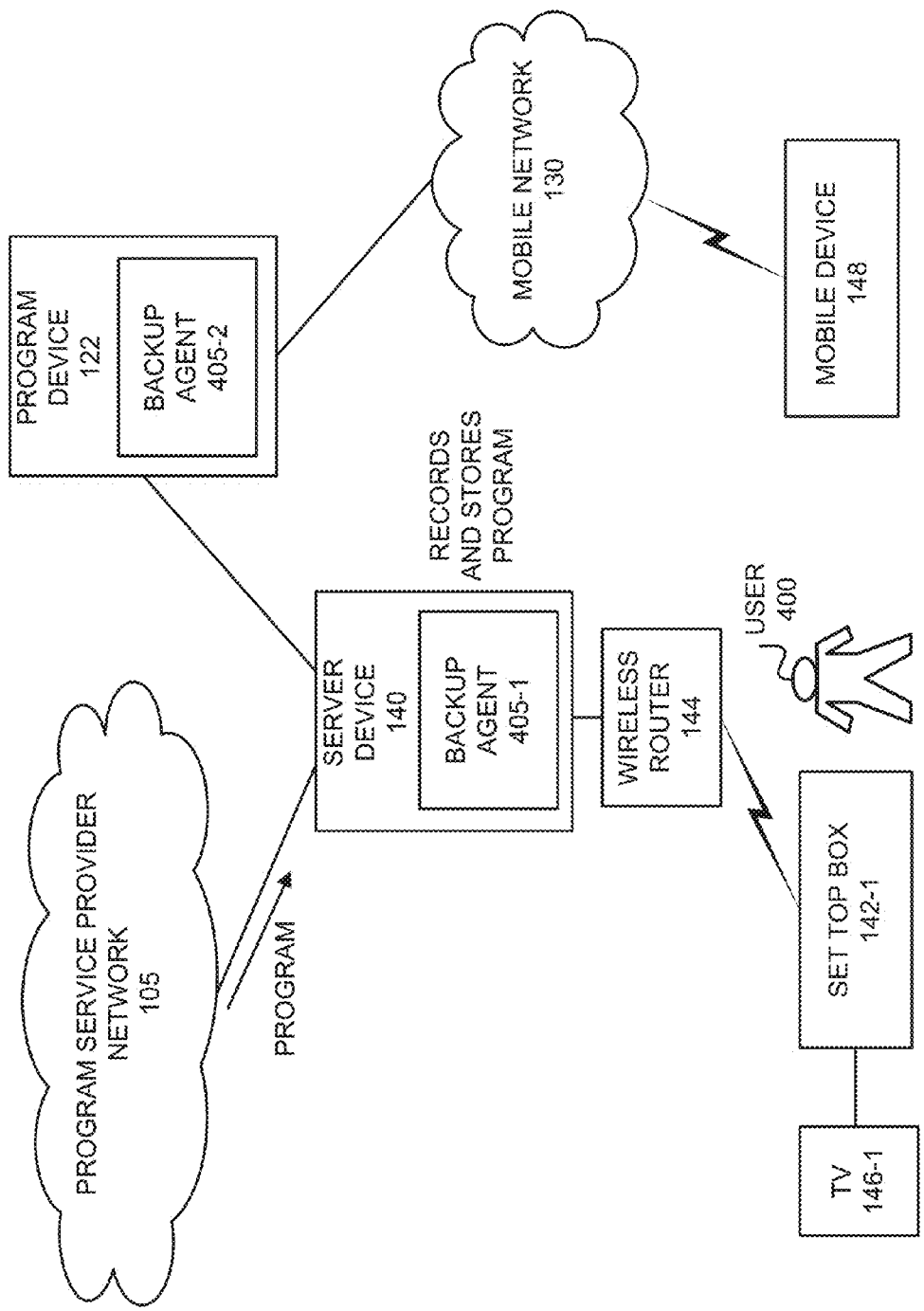
FIGS. 4A-4D are diagrams that illustrate exemplary scenarios pertaining to an exemplary embodiment of a backup agent and a backup service.
Figure 4B:
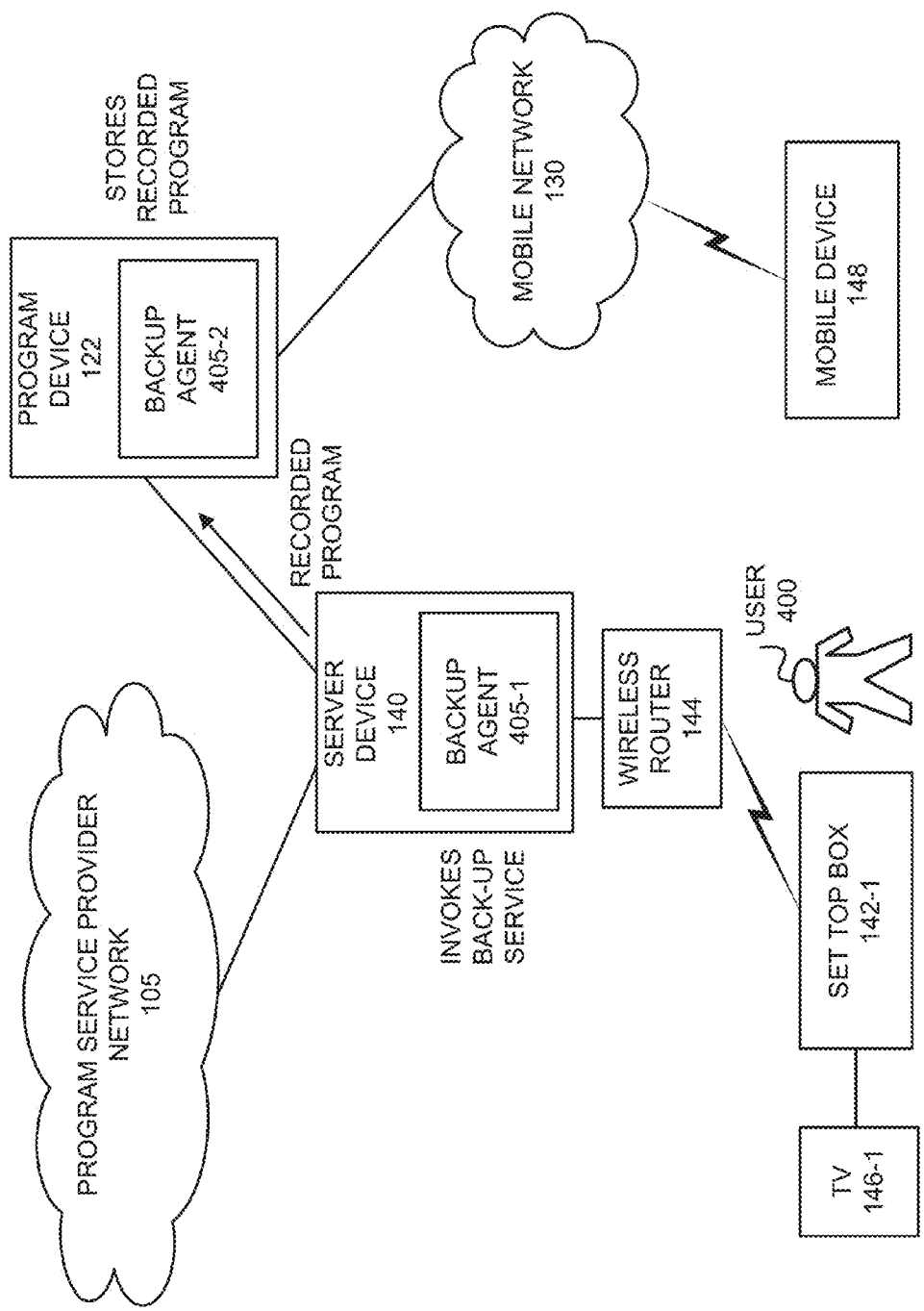

FIGS. 4A-4D are diagrams illustrating exemplary scenarios pertaining to an exemplary embodiment of a backup agent and a backup service. Referring to FIG. 4A, server device 140 includes a back-up agent 405-1 and program device 122 includes a backup agent 405-2. According to an exemplary scenario, assume a user 400 causes server device 140 to record and store a program (e.g., via a DVR service). Referring to FIG. 4B, based on the user settings pertaining to the backup service, backup agent 405-1 invokes the backup service. For example, after the program is recorded, backup agent 405-1 communicates with backup agent 405-2 and uploads the recorded program to program device 122. The recorded program is stored on program device 122.

Figure 4C:
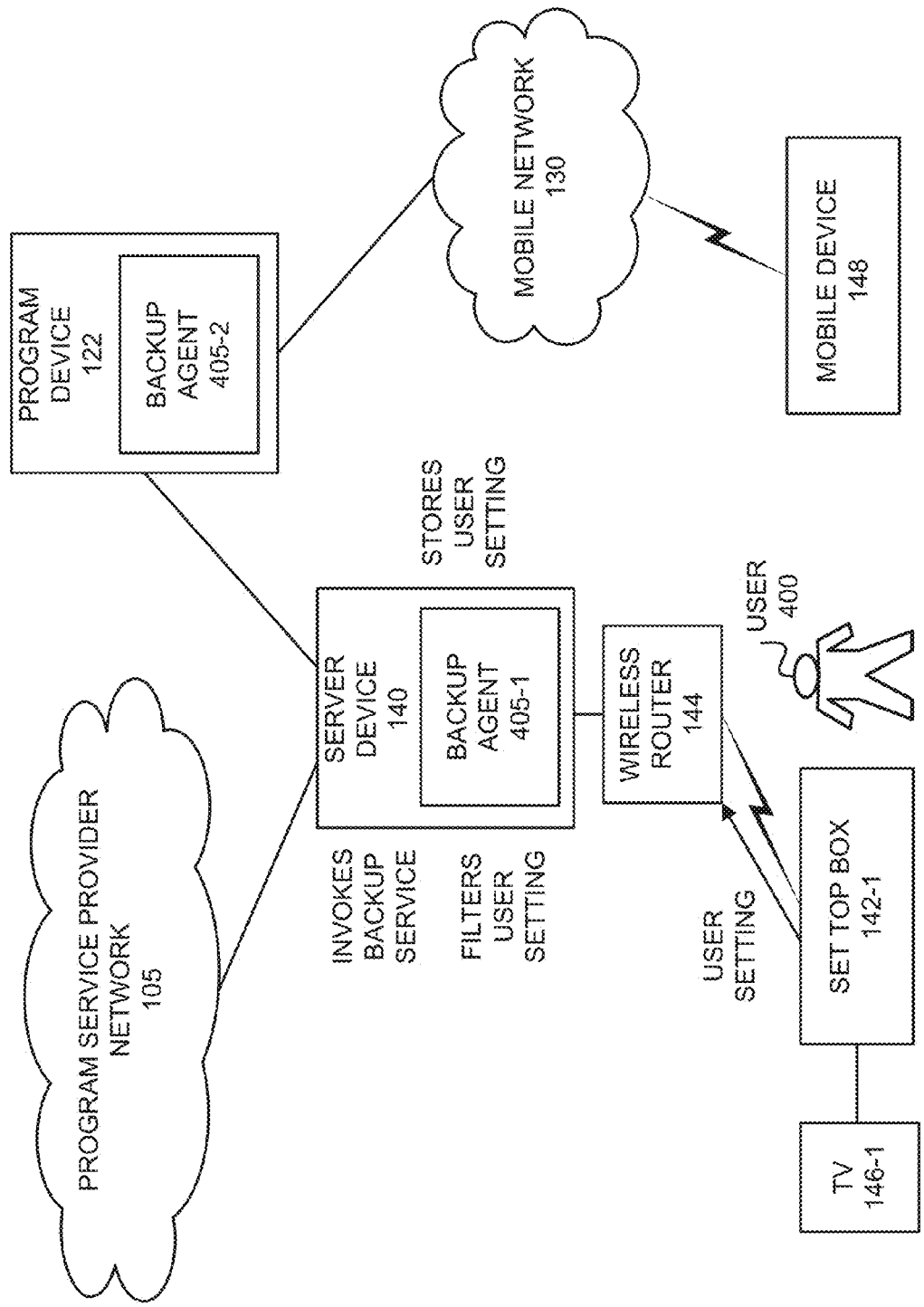

Referring to FIG. 4C, according to another scenario, assume user 400 changes a user setting on server device 140 via set top box 142-1. For example, the user setting is a parental control setting. The user setting is stored on server device 140. Similarly, based on the user settings pertaining to the backup service, backup agent 405-1 invokes the backup service. According to this example, however, backup agent 405-1 filters the user setting and identifies that the parental control features is not supported by program device 122. In response, backup agent 405-1 does not communicate with backup agent 405-2 and the user setting is not uploaded.

Figure 4D:
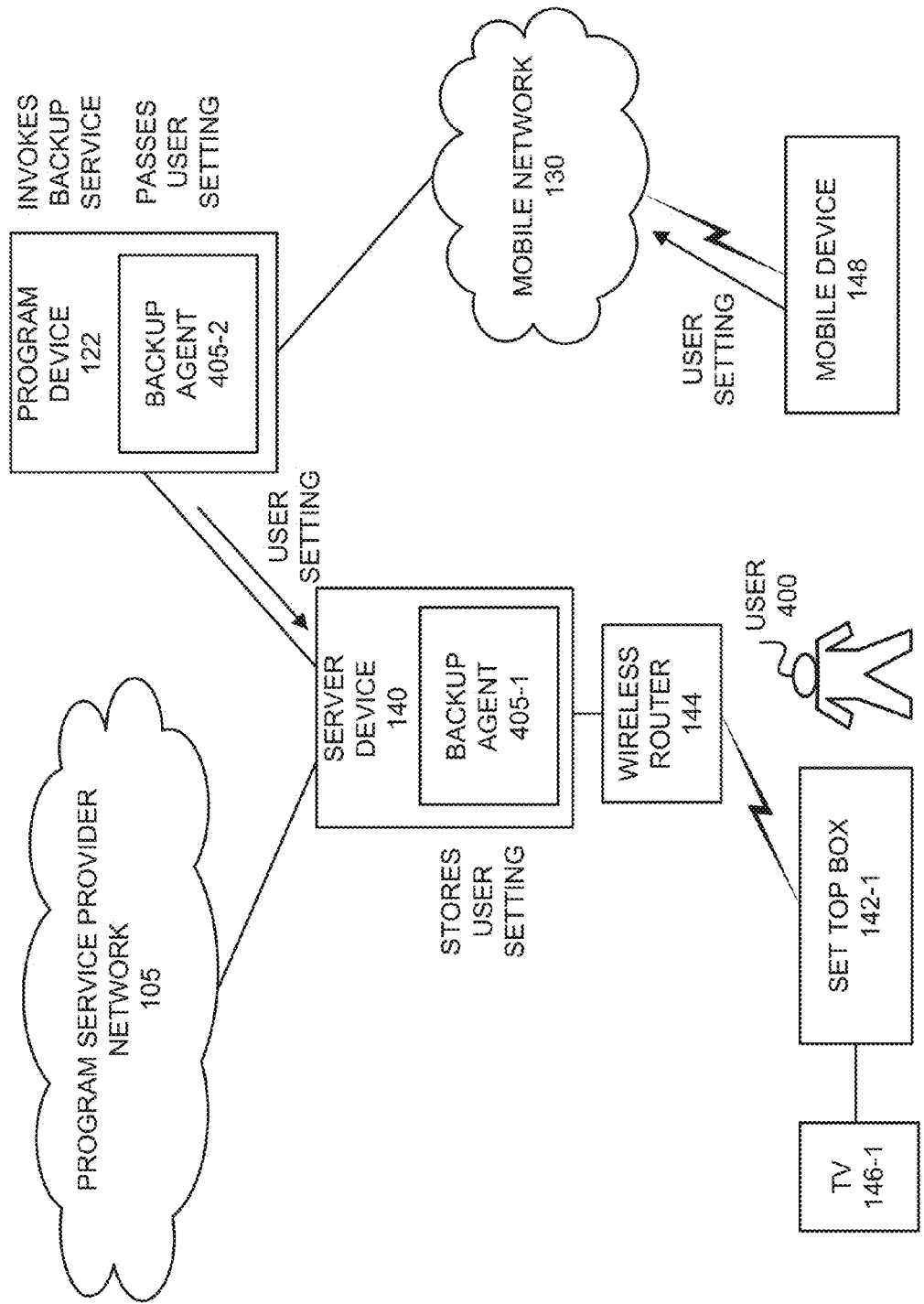

Referring to FIG. 4D, according to yet another scenario, assume user 400 changes a parental control setting via mobile device 148 and program device 122. However, user 400 designates that this user setting is for server device 140. In this case, backup agent 405-2 invokes the backup service and passes the user setting to server device 140. The parental control setting is stored on server device 140.

Figure 5:
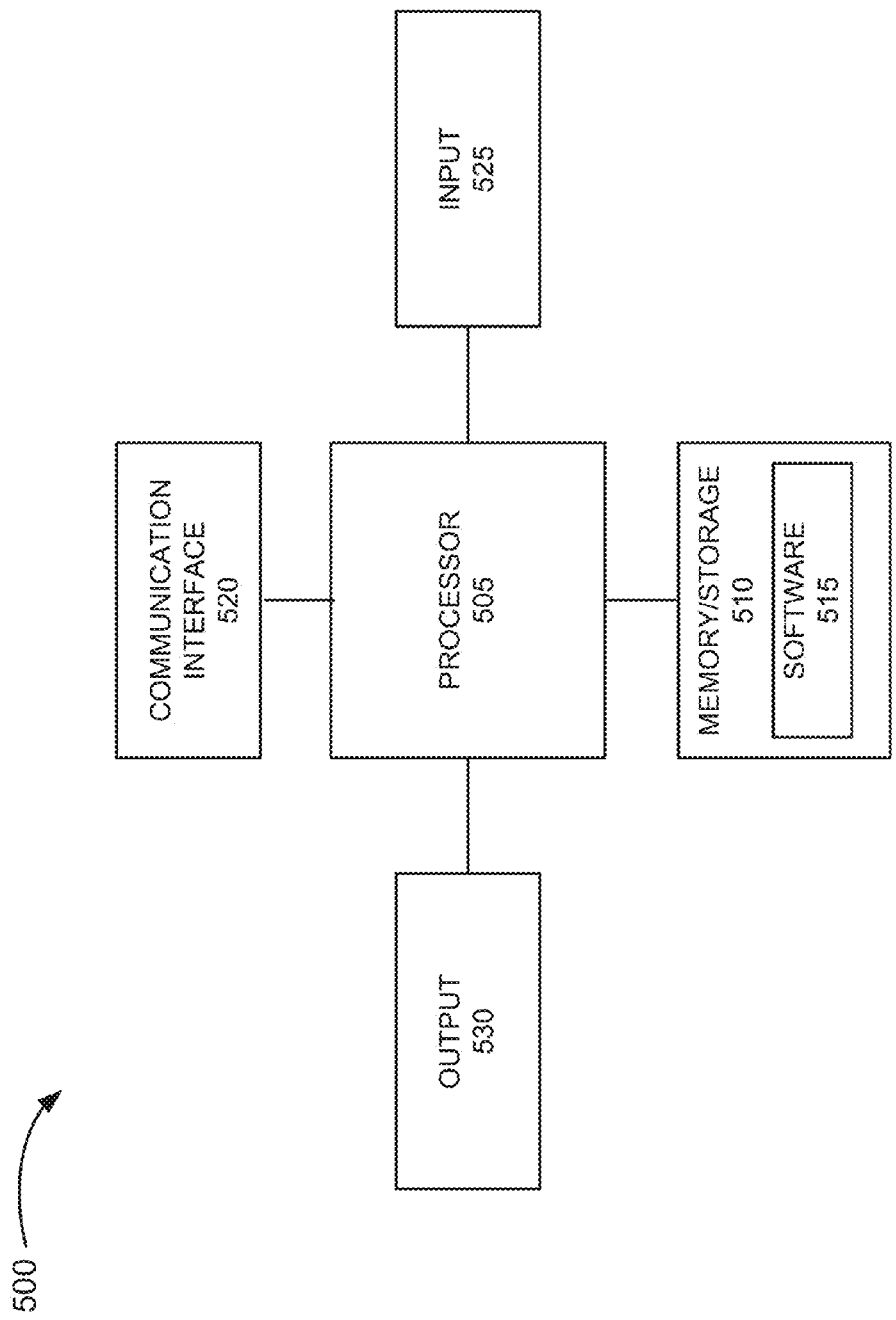
FIG. 5 is a diagram illustrating exemplary components of a device that may correspond to one or more of the devices in the exemplary environment.

FIG. 5 is a diagram illustrating exemplary components of a device 500 that may correspond to one or more of the devices in the environments described herein. For example, device 500 may correspond to program device 122, server device 140, mobile device 148, and/or set top box 142. As illustrated, according to an exemplary embodiment, device 500 includes a processor 505, memory/storage 510 that stores software 515, a communication interface 520, an input 525, and an output 530. According to other embodiments, device 500 may include fewer components, additional components, different components, and/or a different arrangement of components than those illustrated in FIG. 5 and described herein.

Processor 505 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 505 may be implemented as hardware (e.g., a microprocessor, etc.), a combination of hardware and software (e.g., a SoC, an ASIC, etc.), may include one or multiple memories (e.g., cache, etc.), etc.

Processor 505 may control the overall operation or a portion of operation(s) performed by device 500. Processor 505 may perform one or multiple operations based on an operating system and/or various applications or programs (e.g., software 515). Processor 505 may access instructions from memory/storage 510, from other components of device 500, and/or from a source external to device 500 (e.g., a network, another device, etc.).

Memory/storage 510 includes one or multiple memories and/or one or multiple other types of storage mediums. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium.

Memory/storage 510 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 510 may store data, software, and/or instructions related to the operation of device 500.

Software 515 includes an application or a computer program that provides a function and/or a process. Software 515 may include firmware. For example, with reference to set top box 142 and mobile device 148, software 515 may include an application that, when executed by processor 515, provides the functions of monitoring agent 143, as described herein. Additionally, for example, with reference to server device 140, software 515 may include an application that, when executed by processor 515, provides the functions of predictive monitoring agent 150, as described herein. Additionally, software 515 may include an application that provides the functions of backup agent, as described herein.

Communication interface 520 permits device 500 to communicate with other devices, networks, systems, etc. Communication interface 520 may include one or multiple wireless interfaces and/or wired interfaces. Communication interface 520 may include one or multiple transmitters and receivers or transceivers. Communication interface 520 may operate according to a protocol and a communication standard.

Input 525 permits an input into device 500. For example, input 525 may include a keyboard, a mouse, a display, a touchscreen, a touchless screen, a button, a switch, an input port, speech recognition logic, and/or some other type of visual, auditory, tactile, etc., input component. Output 530 permits an output from device 500. For example, output 530 may include a speaker, a display, a touchscreen, a touchless screen, a light, an output port, and/or some other type of visual, auditory, tactile, etc., output component.

Device 500 may perform a process and/or a function, as described herein, in response to processor 505 executing software 515 stored by memory/storage 510. By way of example, instructions may be read into memory/storage 510 from another memory/storage 510 (not shown) or from another device (not shown) via communication interface 520. The instructions stored by memory/storage 510 may cause processor 505 to perform a process described herein. Alternatively, for example, according to other implementations, device 500 may perform a process described herein based on the execution of hardware (processor 505, etc.).

Figure 6:
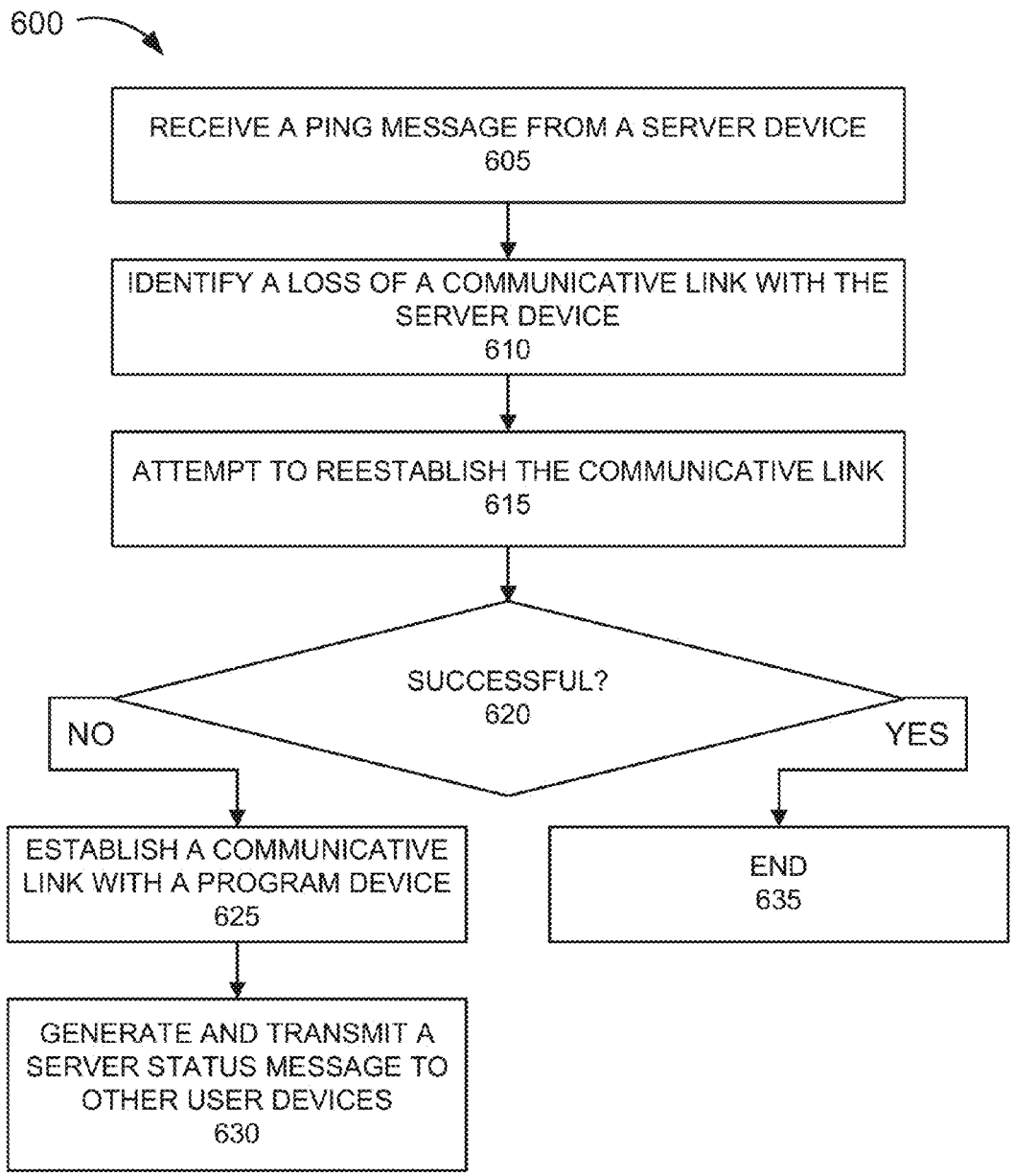
FIG. 6 is a flow diagram that illustrates an exemplary process pertaining to the failover service.

FIG. 6 is a flow diagram illustrating an exemplary process 600 pertaining to the failover service and the monitoring agent. Process 600 is directed to a process previously described above with respect to FIGS. 2A-2C and elsewhere in this description, in which monitoring agent 143 invokes a failover service. According to an exemplary embodiment, monitoring agent 143 performs one or more of the steps described in process 600. For example, processor 505 may execute software 515 to perform the steps described.

Referring to FIG. 6, process 600 begins, in block 605, by receiving a ping message from a server device. For example, set top box 142 receives a ping message from server device 140.

In block 610, a loss of a communicative link with the server device is identified. For example, subsequent to receiving the ping message, set to box 142 identifies that a communicative link with server device 140 is lost. In block 615, a reestablishment of the communicative link is attempted. For example, set top box 142 attempts to reestablish the communicative link with server device 140.

In block 620, it is determined whether the reestablishment is successful. For example, set top box 142 determines whether the communicative link with server device 140 is reestablished. If it is determined that the reestablishment is not successful (block 620—NO), then a communicative link with a program device is established (block 625). For example, set top box 142 establishes the communicative link with program device 122.

In block 630, a server status message is generated and transmitted to other user devices. For example, set top box 142 generates the server status message that indicates server device 140 is down/unavailable. Set top box 142 transmits the server status message to other user devices (e.g., other set top boxes 142, mobile device 148). According to some scenarios, the other user devices may have recently turned on or entered the in-home network, as previously described. According to other scenarios, the receipt of the server status message by another user device may cause the other user device to cease a reestablishment process and more expeditiously switch over to program device 122.

If it is determined that the reestablishment is successful (block 620—YES), then process 600 ends (block 635). For example, set top box 142 reestablishes the communicative link with server device 140. Set top box 142 receives the program service via server device 140.

Although FIG. 6 illustrates an exemplary failover process 600, according to other embodiments, process 600 may include additional operations, fewer operations, and/or different operations than those illustrated in FIG. 6 and described.

Figure 7:
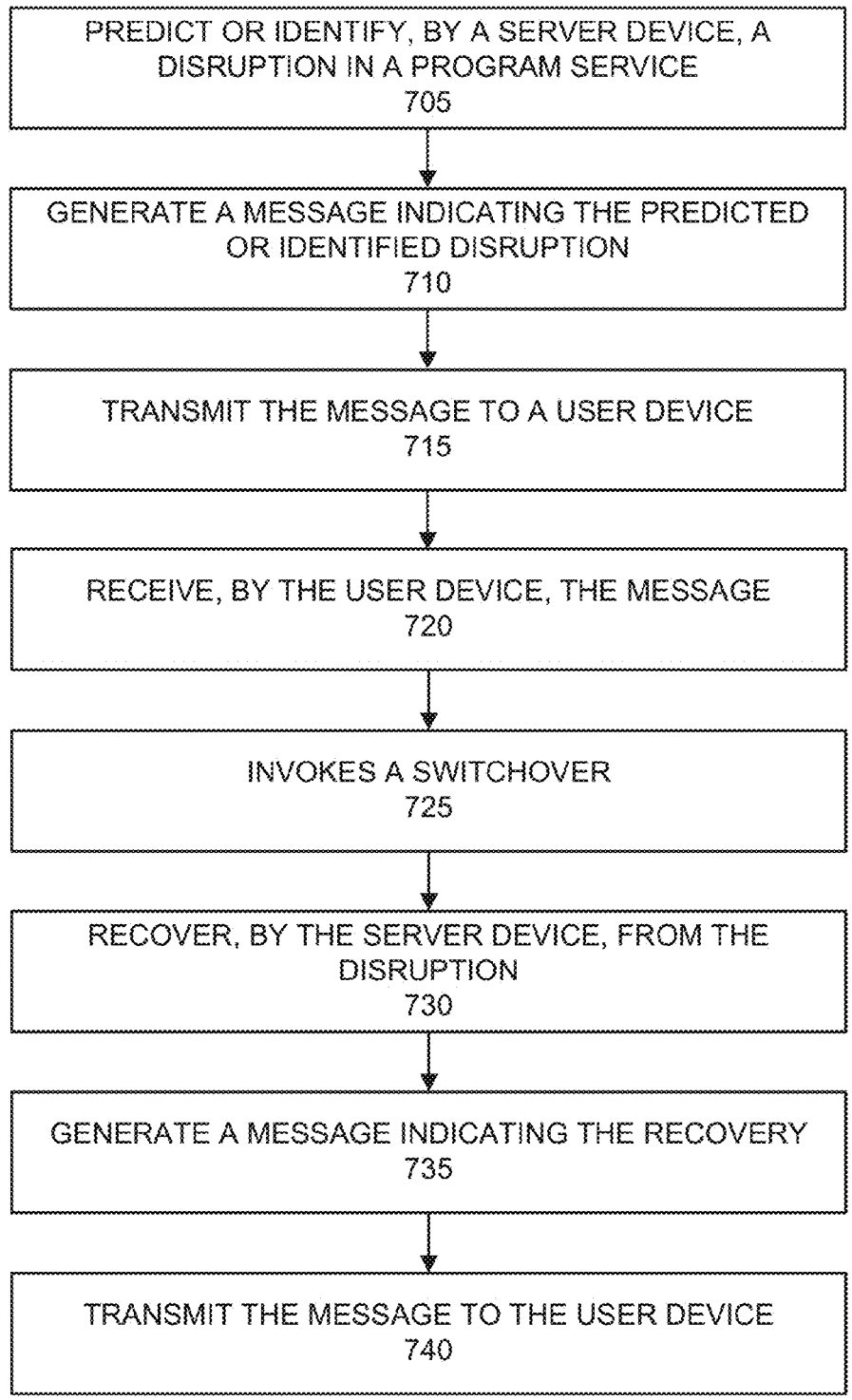
FIG. 7 is a flow diagram that illustrates an exemplary process pertaining to the predictive failover service.

FIG. 7 is a flow diagram illustrating an exemplary process 700 pertaining to the failover service and the predictive monitoring agent. Process 700 is directed to a process previously described above with respect to FIGS. 2G-2J and elsewhere in this description, in which predictive monitoring agent 150 invokes a failover service. According to an exemplary embodiment, predictive monitoring agent 150 performs one or more of the steps described in process 700. For example, processor 505 may execute software 515 to perform the steps described.

Referring to FIG. 7, process 700 begins, in block 705, by a server device predicting or identifying a disruption in a program service. For example, server device 140 predicts or identifies a disruption in providing the program service to end users.

In block 710, a message indicating the predicted or identified disruption is generated. For example, server device 140 generates a failure message. The failure message indicates that server device 140 is predicted to fail. In block 715, the message is transmitted to a user device. For example, server device 140 transmits the failure message to set top box 142.

In block 720, the message is received by the user device. For example, set top box 142 receives the failure message. In block 725, the user device invokes a switchover. For example, set top box 142 interprets the failure message, disconnects from server device 140, and establishes a communicative link with program device 122.

In block 730, the server device recovers from the disruption. For example, server device 140 reboots (e.g., due to a failure) and restores to a stable state. In block 735, a message indicating the recovery is generated. For example, server device 140 generates a recovery message that indicates server device 140 is in a stable state and available to provide the program service.

In block 740, the message is transmitted to the user device. For example, server device 140 transmits the recovery message to set top box 142. Server device 140 establishes a communicative link with set top box 142.

Although FIG. 7 illustrates an exemplary failover process 700, according to other embodiments, process 700 may include additional operations, fewer operations, and/or different operations than those illustrated in FIG. 7 and described.

Figure 8:
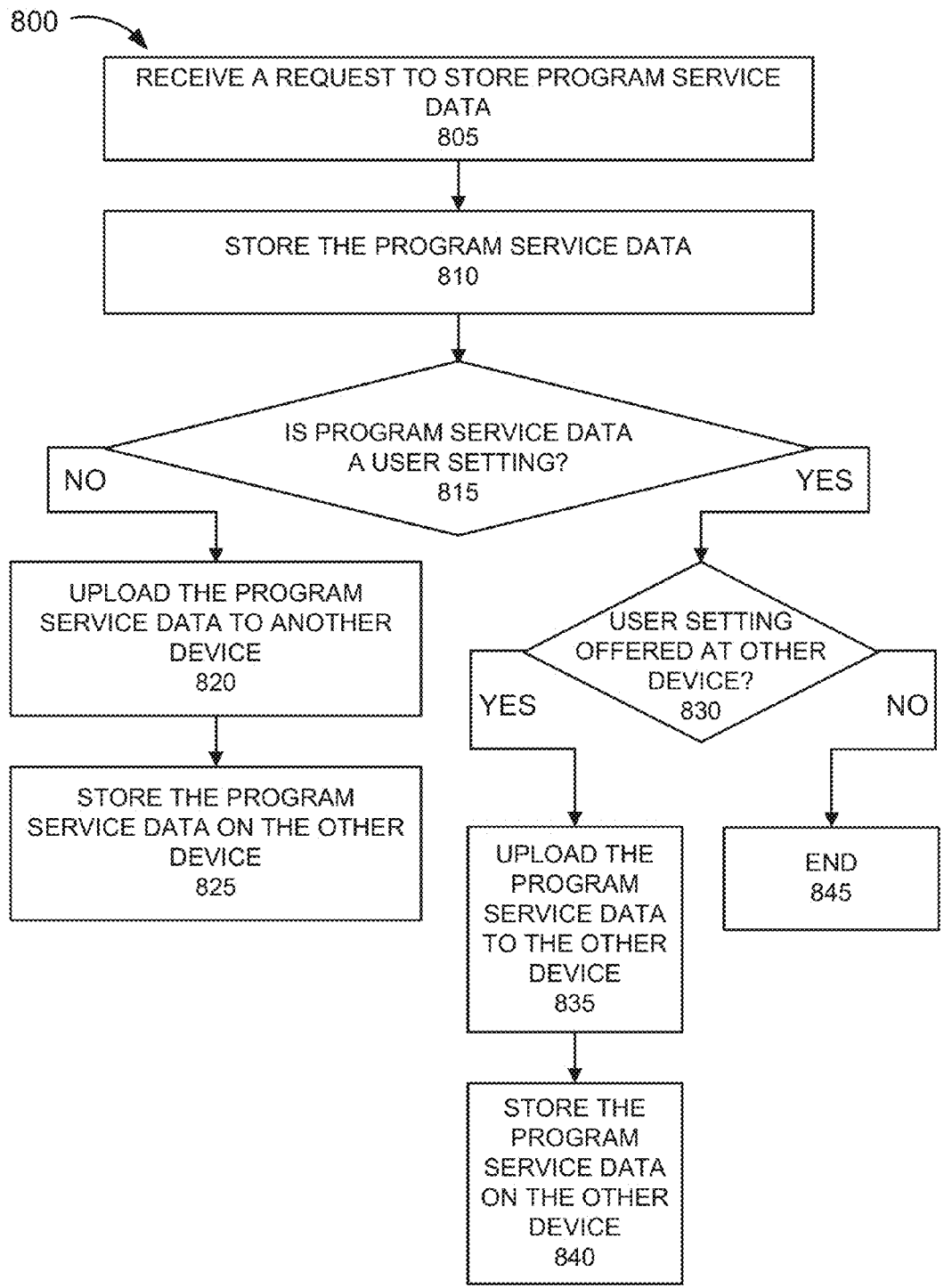
FIG. 8 is a flow diagram that illustrates an exemplary process pertaining to the backup service.

FIG. 8 is a flow diagram illustrating an exemplary process 800 pertaining to the backup service and the backup agent. Process 800 is directed to a process previously described above with respect to FIGS. 4A-4B and elsewhere in this description, in which backup agent 405 invokes the backup service. According to an exemplary embodiment, backup agent 405 performs one or more of the steps described in process 800. For example, processor 505 may execute software 515 to perform the steps described.

Referring to FIG. 8, process 800 begins, in block 805, receiving a request to store program service data. For example, server device 140 receives a request to record a program or change a user setting.

In block 810, the program service data is stored. For example, server device 140 stores the program service data. In block 815, it is determined whether the program service data includes a user setting. For example, server device 140 identifies whether a change in the already stored program service data pertains to a program, a user setting, or both.

If it is determined that the program service data does not include a user setting (block 815—NO), then the program service data is uploaded to another device (block 820). For example, server device 140 uploads the program service data to program device 122 based on the user settings pertaining to the backup service. In block 825, the program service data is stored by the other device. For example, program device 122 stores the program service data.

If it is determined that the program service data includes a user setting (block 815—YES), then it is determined whether the user setting is offered at the other device (block 830). For example, server device 140 identifies whether the user setting feature is offered at program device 122. By way of further example, the parental control feature may not be offered by program device 122.

If it is determined that the user setting is offered at the other device (block 830—YES), then the program service data is uploaded to the other device (block 835). For example, server device 140 uploads the program service data to program device 122 based on the user settings pertaining to the backup service. In block 840, the program service data is stored on the other device. For example, program device 122 stores the program service data.

If it is determined that the user setting is not offered at the other device (block 830—NO), then process 800 ends. For example, server device 140 omits to upload, at least this portion of the updated program service data, to program device 122.

Although FIG. 8 illustrates an exemplary backup process 800, according to other embodiments, process 800 may include additional operations, fewer operations, and/or different operations than those illustrated in FIG. 8 and described.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6, 7, and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 505, etc.), or a combination of hardware and software (e.g., software 515). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is executable by a processor (e.g., processor 505). A non-transitory storage medium includes one or more of the storage mediums described in relation to memory/storage 510.

No element, act, or instruction described in the present application should be construed as critical or essential to the embodiments described herein unless explicitly described as such.

What is claimed is:

1. A method comprising:
providing, by a server device and to user devices, a program service that includes a delivery of linear television programs to the user devices that are connected via communicative links, wherein the user devices include a set top box;
predicting, by the server device, whether a first disruption in the program service is to occur, wherein the first disruption corresponds to a complete loss of the program service and the predicting comprises predicting based on disruption indicators, wherein the disruption indicators include temperature of hardware resident on the server device, state of communicative links between the server device and another device, system activity logs, error logs, and hardware and software disruption signatures;
predicting, by the server device, whether a second disruption in the program service is to occur, wherein the second disruption corresponds to a degradation of the program service but not the complete loss of the program service;
generating, by the server device, a first message that indicates a predicted disruption of the program service in response to predicting the first disruption or the second disruption is to occur;
transmitting, by the server device, the first message to the user devices;
disconnecting, by the server device, the communicative links via which the program service is provided, with the user devices;
determining, by the server device, whether the server device is in a stable state;
generating, by the server device, a second message that indicates the program service is available via the server device, in response to determining that the server device is in the stable state;
transmitting, by the server device, the second message to the user devices; and
establishing, by the server device, communicative links with the user devices.

2. The method of claim 1, wherein predicting whether the first disruption is to occur comprises:
analyzing the disruption indicators.

3. The method of claim 1, further comprising:
identifying the disruption in the program service based on a scheduled update of the server device; and generating the first message in response to the identifying, and wherein the first message includes a probability value indicative of a probability of the disruption to occur.

4. The method of claim 1, wherein predicting whether the first disruption is to occur comprises:
predicting based on at least one of a Multivariate State Estimation Technique, a Markov chain-based model, or a Bayesian network model.

5. The method of claim 1, wherein the first message indicates a predicted time that the server device is expected to recover.

6. The method of claim 1, further comprising:
establishing, by the user devices, communicative links with the program service via another device, in response to receiving the first message.

7. The method of claim 1, further comprising:
rebooting, by the server device, subsequent to predicting the first disruption.

8. A network device comprising:
tuners, wherein the tuners tune to programs;
a communication interface;
a memory, wherein the memory stores instructions; and
a processor, wherein the processor executes the instructions to:
provide, via the communication interface, a program service that includes a delivery of programs to user devices that are connected via communicative links, wherein the user devices include a set top box, and the programs include linear television programs;
predict whether a first disruption in the program service is to occur, wherein the first disruption corresponds to a complete loss of the program service and the prediction comprises to predicting based on disruption indicators, wherein the disruption indicators include temperature of hardware resident on the server device, state of communicative links between the server device and another device, system activity logs, error logs, and hardware and software disruption signatures;
predict whether a second disruption in the program service is to occur, wherein the second disruption corresponds to a degradation of the program service but not the complete loss of the program service;
generate a first message that indicates a predicted disruption of the program service in response to a prediction that the first disruption is to occur or the second disruption is to occur;
transmit, via the communication interface, the first message to the user devices;
disconnect the communicative links via which the program service is provided, with the user devices;
determine whether the network device is in a stable state;
generate a second message that indicates the program service is available via the network device in response to a determination that the network device is in the stable state;
transmit, via the communication interface, the second message to the user devices; and
establish, via the communication interface, communicative links with the user devices.

9. The network device of claim 8, wherein, when predicting whether the first disruption is to occur, the processor further executes the instructions to:
analyze the disruption indicators.

10. The network device of claim 8, wherein the processor further executes the instructions to:
identify the disruption in the program service based on a scheduled update of the network device; and
generate the first message in response to an identification of the disruption, and wherein the first message includes a probability value indicative of a probability of the disruption to occur.

11. The network device of claim 8, wherein, when predicting whether the first disruption is to occur, the processor further executes the instructions to:
predict based on at least one of a Multivariate State Estimation Technique, a Markov chain-based model, or a Bayesian network model.

12. The network device of claim 8, wherein the processor further executes the instructions to:
reboot the network device subsequent to the transmission of the first message.

13. The network device of claim 8, wherein the first message indicates a predicted time that the network device is expected to recover.

14. The network device of claim 8, wherein, when determining, the processor further executes the instructions to:
analyze an event log that indicates a measure performed by the network device in response to a failure; and
analyze a system activity log that indicates a current state of the network device.

15. The network device of claim 8, wherein the network device comprises an in-home media server, and wherein the user devices include a mobile communication device.

16. A non-transitory, computer-readable storage medium storing instructions executable by a processor of a computational device to:
provide a program service that includes a delivery of programs to user devices that are connected via communicative links, wherein the user devices include a set top box, and the programs include linear television programs;
predict whether a first disruption in the program service is to occur, wherein the first disruption corresponds to a complete loss of the program service and the prediction comprises predicting based on disruption indicators, wherein the disruption indicators include temperature of hardware resident on the server device, state of communicative links between the server device and another device, system activity logs, error logs, and hardware and software disruption signatures;
predict whether a second disruption in the program service is to occur, wherein the second disruption corresponds to a degradation of the program service but not the complete loss of the program service;
generate a first message that indicates a predicted disruption of the program service in response to a prediction that the first disruption is to occur or the second disruption is to occur;
transmit the first message to the user devices;
disconnect the communicative links via which the program service is provided, with the user devices;
determine whether the computational device is in a stable state;
generate a second message that indicates the program service is available via the computational device in response to a determination that the computational device is in the stable state;
transmit the second message to the user devices; and
establish communicative links with the user devices.

17. The non-transitory, computer-readable storage medium of claim 16, further storing instructions executable by the processor of the computational device to:
  analyze the disruption indicators.

18. The non-transitory, computer-readable storage medium of claim 16, further storing instructions executable by the processor of the computational device to:
  reboot the computational device subsequent to the transmission of the first message.

19. The non-transitory, computer-readable storage medium of claim 16, further storing instructions executable by the processor of the computational device to:
  analyze an event log that indicates a measure performed by the computational device in response to a failure; and
  analyze a system activity log that indicates a current state of the computational device.

20. The non-transitory, computer-readable storage medium of claim 16, further storing instructions executable by the processor of the computational device to:
  identify the disruption in the program service based on a scheduled update of the computational device; and
  generate the first message in response to an identification of the disruption, and wherein the first message includes a probability value indicative of a probability of the disruption to occur.

* * * * *